US009456617B2

(12) United States Patent
Rau et al.

(10) Patent No.: US 9,456,617 B2
(45) Date of Patent: Oct. 4, 2016

(54) DEVEINING SYSTEM AND DEVICE

(71) Applicant: Laitram, L.L.C., Harahan, LA (US)

(72) Inventors: Brien G. Rau, Jefferson, LA (US); Christopher G. Greve, Covington, LA (US); Scott J. Sirgo, Abita Springs, LA (US); Robert S. Lapeyre, New Orleans, LA (US); Kevin J. Turner, Harahan, LA (US); Charles L. Borrello, New Orleans, LA (US); Brady P. Horn, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 331 days.

(21) Appl. No.: 14/138,284

(22) Filed: Dec. 23, 2013

(65) Prior Publication Data

US 2014/0187132 A1 Jul. 3, 2014

Related U.S. Application Data

(60) Provisional application No. 61/748,284, filed on Jan. 2, 2013.

(51) Int. Cl.
*A22C 29/00* (2006.01)
*A22C 29/02* (2006.01)

(52) U.S. Cl.
CPC .................. *A22C 29/022* (2013.01)

(58) Field of Classification Search
CPC .. A22C 29/00; A22C 29/021; A22C 29/022; A22C 29/026; A22C 29/024
USPC ...................................... 452/2–5, 7
See application file for complete search history.

(56) References Cited

U.S. PATENT DOCUMENTS

| | | | |
|---|---|---|---|
| 2,684,500 A | 7/1954 | Jones et al. | |
| 2,694,218 A | 11/1954 | Lapeyre et al. | |
| 2,712,152 A * | 7/1955 | Samanie | A22C 29/021 209/689 |
| 2,825,927 A | 3/1958 | Lapeyre et al. | |
| 2,928,117 A | 3/1960 | Lapeyre et al. | |
| 2,960,719 A | 11/1960 | Merrick | |
| 3,031,714 A | 5/1962 | Skrmetta et al. | |
| 3,143,763 A | 8/1964 | Welcker et al. | |
| 3,159,871 A | 12/1964 | Jonsson | |
| 3,393,424 A | 7/1968 | Welcker et al. | |
| 3,430,288 A | 3/1969 | Lapeyre | |
| 3,566,437 A | 3/1971 | Jonsson | |
| 3,698,038 A | 10/1972 | Jones, Jr. | |
| 3,703,746 A | 11/1972 | Jones, Jr. | |
| 3,787,928 A | 1/1974 | Domecki | |
| 3,867,740 A | 2/1975 | Lapine et al. | |
| 4,121,322 A * | 10/1978 | Rutledge | A22C 29/026 452/5 |
| 4,393,543 A | 7/1983 | Martin | |
| 4,413,377 A | 11/1983 | Betts | |

(Continued)

OTHER PUBLICATIONS

European Search Report of European Application No. 13199554.0, dated Mar. 14, 2014, European Patent Office, Munich, Germany.

*Primary Examiner* — Richard Price, Jr.
(74) *Attorney, Agent, or Firm* — Catherine M. Bishop

(57) ABSTRACT

A deveining device efficiently removes veins from shrimp while preserving the meat of the shrimp in both appearance and quantity. The deveining device comprises a channel having a blade extending along a section of the channel for cutting the back of the shrimp as it rolls through the channel to expose a vein. A downstream vein remover severs the exposed vein from the shrimp body. Nozzles spray fluid into the channel to propel the shrimp through the channel.

29 Claims, 30 Drawing Sheets

(56) References Cited

U.S. PATENT DOCUMENTS

| | | |
|---|---|---|
| 4,414,709 A | 11/1983 | Betts |
| 4,439,893 A | 4/1984 | Betts |
| 4,692,965 A | 9/1987 | Stephenson |
| 4,745,660 A | 5/1988 | Betts et al. |
| 4,996,744 A | 3/1991 | Meyer |
| 5,035,669 A * | 7/1991 | Betts ............... A22C 29/026 452/3 |
| 5,195,921 A * | 3/1993 | Ledet ............... A22C 29/028 452/2 |
| 5,290,199 A | 3/1994 | Morris |
| 5,435,775 A | 7/1995 | Jonas |
| 5,522,764 A | 6/1996 | Keith et al. |
| 5,569,065 A | 10/1996 | Sawyer et al. |
| 5,613,903 A | 3/1997 | Harris et al. |
| 6,129,621 A | 10/2000 | Shelton |
| 6,200,209 B1 | 3/2001 | Shelton |
| 6,273,807 B1 | 8/2001 | Shelton |
| 6,435,959 B1 * | 8/2002 | Skrmetta ............... A22C 29/00 452/5 |
| 8,616,940 B2 * | 12/2013 | Vedsted ............... A22B 5/166 452/5 |
| 8,870,632 B2 * | 10/2014 | Vedsted ............... A22B 5/166 452/5 |

* cited by examiner

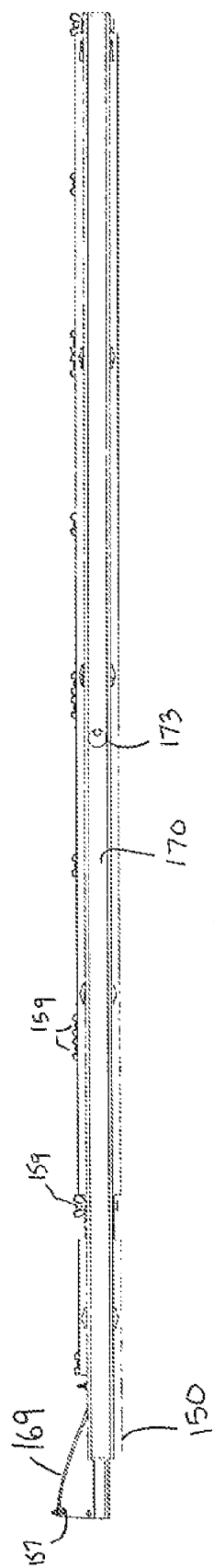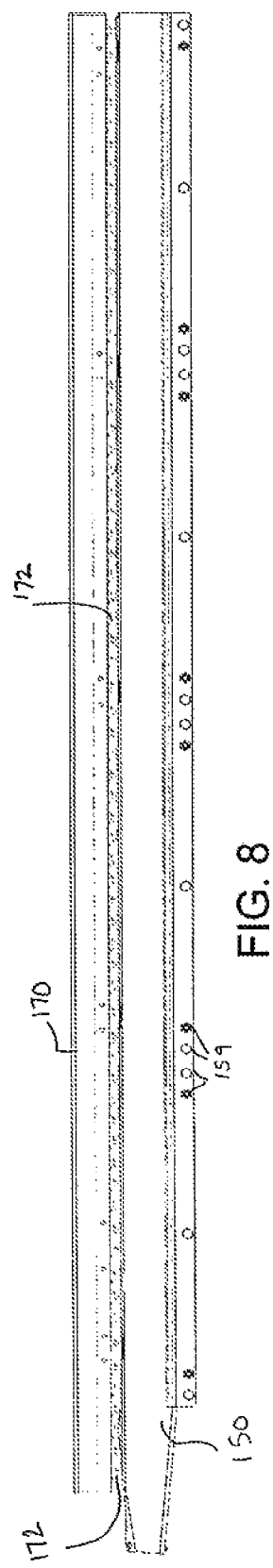

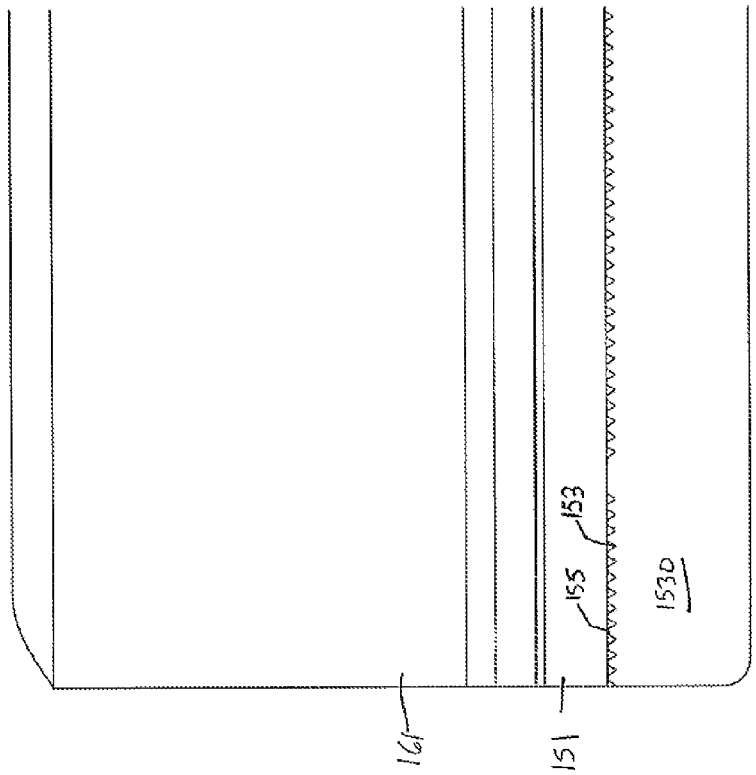
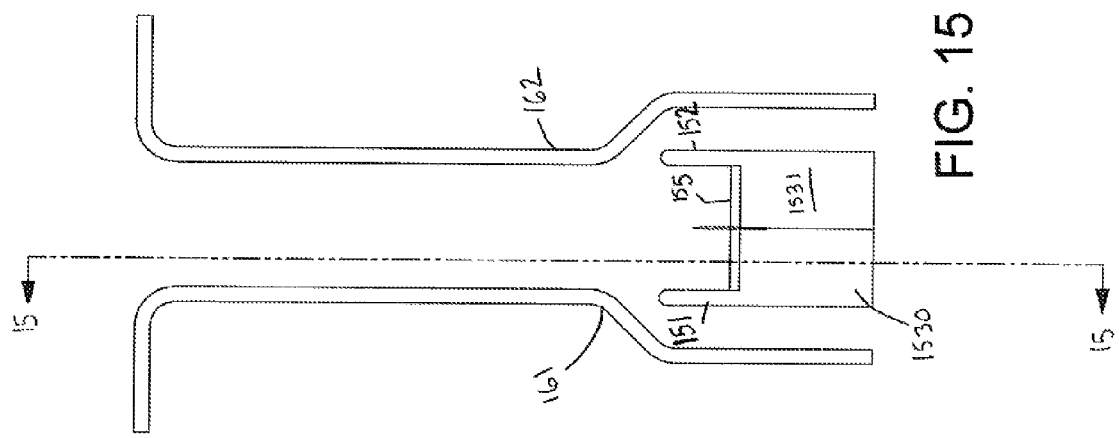

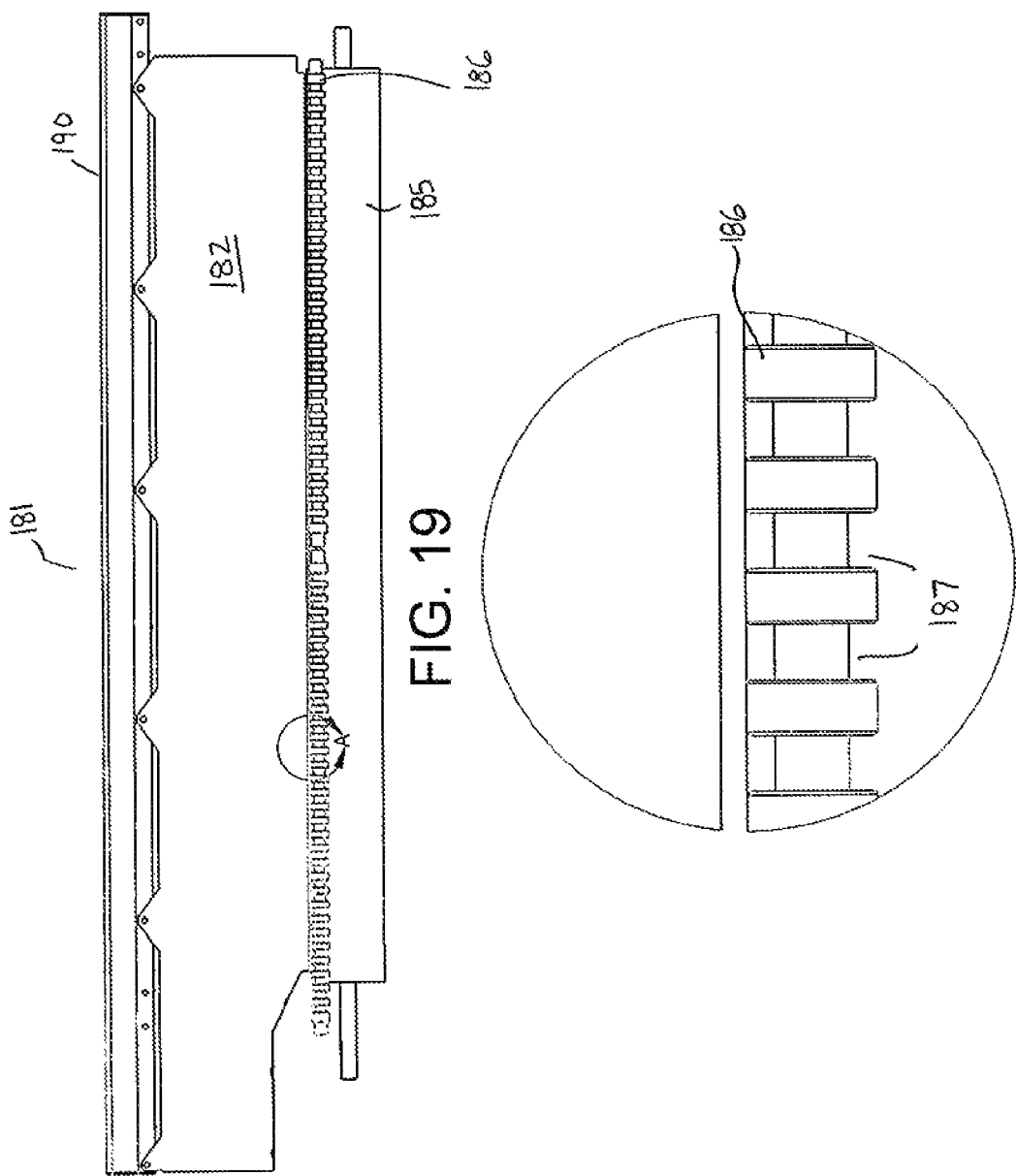

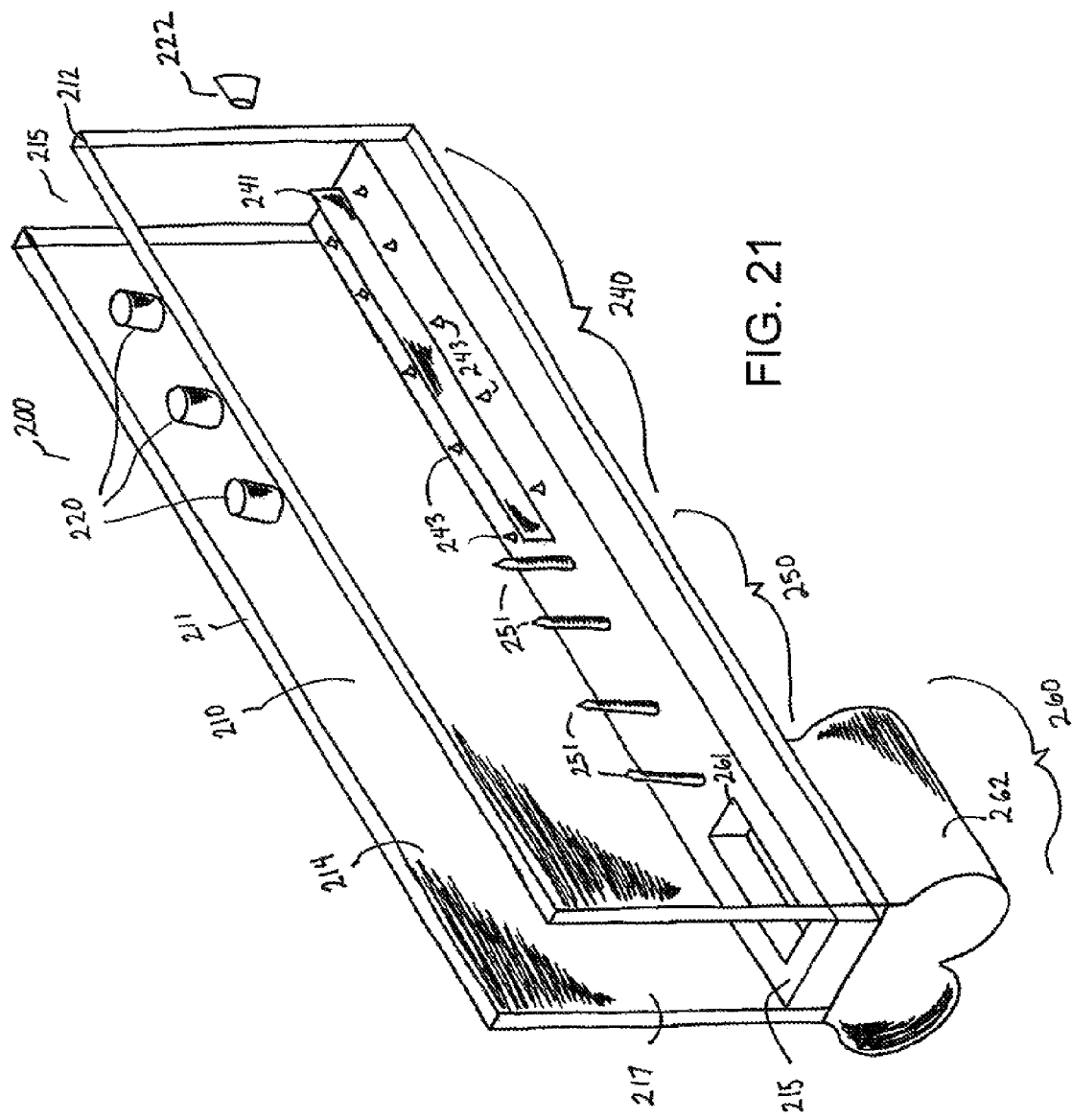

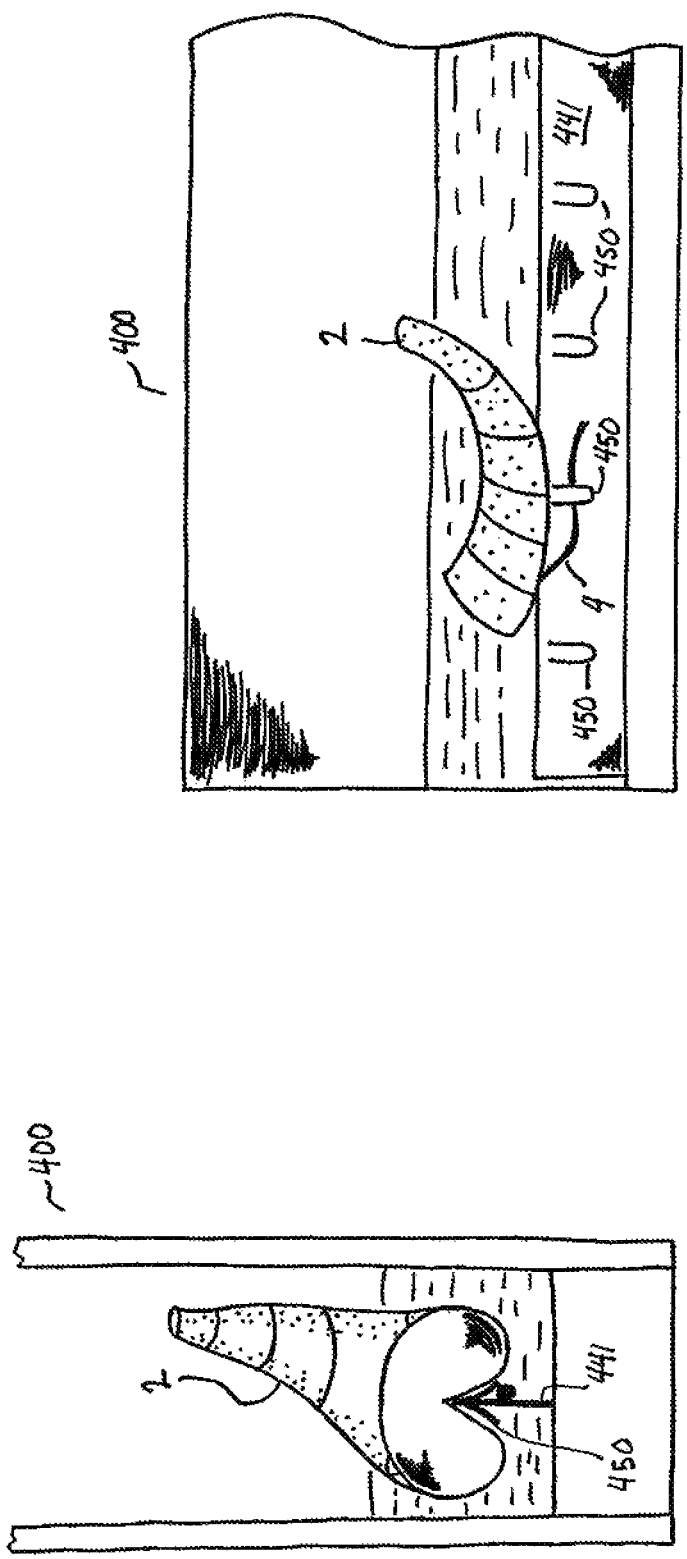

DEVEINING SYSTEM AND DEVICE

RELATED APPLICATIONS

The present invention claims priority to U.S. Provisional Patent Application Ser. No. 61/748,284 filed Jan. 2, 2013 and entitled "Deveining Device," the contents of which are incorporated herein by reference.

FIELD OF THE INVENTION

The present invention relates to a device for removing veins from shrimp or other crustaceans.

BACKGROUND OF THE INVENTION

In preparing shrimp, crawfish or other animals having a vein in the alimentary canal, it is often desirable to remove the vein. Current options for deveining shrimp include manual removal, which is inefficient and time-consuming, and automated devices known in the art. With manual operations, a worker must perform a number of operations to partially or entirely remove the shell from the meat of the shrimp, and cut the meat of the shrimp in a manner desirable to the end user. Manual vein removal is relatively time consuming and thus can lead to higher costs. Moreover, such prolonged contact between workers and the shrimp can lead to contamination of the shrimp. Additionally, the resulting processed product can be less than uniform depending upon the individual worker performing the operation, and the diligence with which the worker processes the shrimp.

Prior automated deveining devices may also lack efficiency, and can also damage the meat, leading to both an undesirable appearance in the shrimp and a reduced quantity of the meat. In automated deveining devices, cutting blades often tear into the meat, making many processed shrimp undesirable for presentation and-or wasting valuable meat product.

SUMMARY OF THE INVENTION

A shrimp deveining system efficiently removes veins from shrimp or other animals while preserving the meat of the shrimp in both appearance and quantity. The shrimp deveining system capitalizes on a shrimp's tendency to roll in a vertical orientation when acted upon by a motive force. A deveining device comprises a channel having a blade extending from a wall of the channel for cutting the back of the shrimp as it rolls through the channel. A downstream vein remover severs the vein from the shrimp body. A motive force, such as nozzles spraying fluid into the channel, propels the shrimp through the channel.

According to one aspect of the invention, a shrimp deveining device is provided. The shrimp deveining device comprises a channel having an inlet, outlet and walls for holding a shrimp in a substantially vertical orientation, a driver for causing the shrimp to roll through the channel and a blade protruding from a wall of the channel. The blade slices open back meat of a shrimp rolling through the channel to expose the vein of the shrimp.

According to another aspect of the invention, a shrimp deveining device comprises a linear channel having an inlet, an outlet, a bottom and walls for holding the shrimp in a substantially vertical orientation, and a linear blade protruding from the bottom of the channel for slicing open back meat of a shrimp in the channel to expose the vein.

According to still another aspect of the invention, a shrimp deveining device comprises a linear channel extending from an inlet to an outlet and having walls for holding a shrimp in a substantially vertical orientation, a slicing section in a first location of the linear channel for slicing open the back meat of a shrimp in the channel to expose the vein, and a vein severing section downstream of the slicing section for separating the vein from the body of the shrimp.

According to yet another aspect of the invention, a method of deveining shrimp comprises the steps of causing a shrimp to roll in a channel, slicing open the alimentary canal of the shrimp to expose the vein using a blade disposed in the channel, removing the vein from the alimentary canal of the shrimp.

BRIEF DESCRIPTION OF THE FIGURES

These features and aspects of the invention, as well as its advantages, are described in more detail in the following description, appended claims, and accompanying drawings, in which:

FIG. 7 is a top view of the slicing channel of FIG. 6;

FIG. 8 is a side view of the slicing channel of FIG. 6;

FIG. 15 is an end view of the slicing channel of FIG. 14;

FIG. 16 is a cross-sectional view of the slicing channel of FIG. 15 through lines 15-15;

FIG. 19 is a side view of the vein severing channel of FIG. 17;

FIG. 20 is a detailed view of a knurled roller of the vein severing channel of FIG. 17;

FIG. 21 is a schematic view of a deveining device according to an embodiment of the invention;

FIG. 28 is a front view of the combined slicing and extraction section of FIG. 27.

FIG. 29 is a side view of the combined slicing and extraction section of FIG. 27;

DETAILED DESCRIPTION

An improved deveining system cleanly removes a vein from a shrimp or other crustacean. The deveining system capitalizes on a vertically-oriented shrimp's tendency to roll when acted upon by a motive force. The invention will be described relative to certain illustrative embodiments, though those skilled in the art will recognize that the invention is not limited to the described embodiments.

Figure 1:
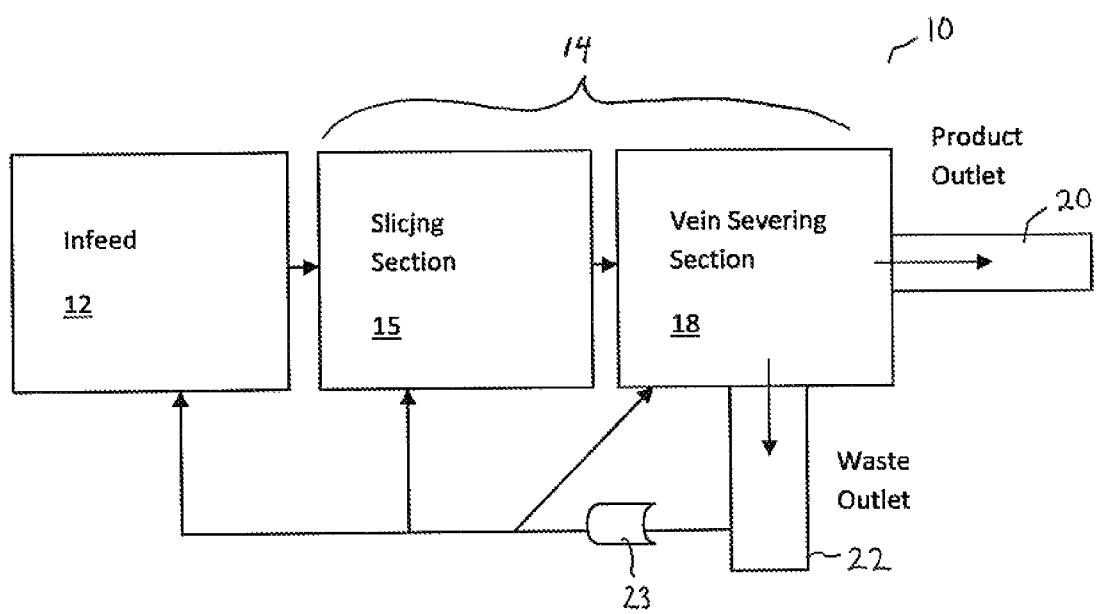
FIG. 1 is a block diagram of a deveining system according to an embodiment of the invention.

FIG. 1 is a block diagram of the components of a deveining system 10 according to an illustrative embodiment of the invention. The deveining system includes an infeed 12 for feeding product, such as shrimp, to be deveined. The infeed 12 may be a reciprocating or vibrating feed trough, as described in US. Patent Application Publication Number 2013/0313169, entitled "System and Method for Grading Articles and Selectively Mixing Graded Articles" filed Feb. 2, 2012 and published Nov. 28, 2013, the contents of which are incorporated by reference, or any other suitable infeed system. The infeed 12 passes products to be deveined into a deveining section 14, comprising a slicing section 15 and a vein severing section 18. The slicing section 15 includes one or more blades for slicing open the backs of shrimp to expose or extract a vein, examples of which are described below. The vein severing section 18 separates the vein from the meat of the shrimp. The illustrative deveining system 10 includes a product outlet 20 for deveined product and a waste outlet 22 for veins and other waste, though alternatively, the waste and deveined product may exit together. The waste may be filtered with a filter 23, and the water used to facilitate deveining, as described below, may be recycled back to the infeed 12, slicing section 15, and-or vein severing section 18.

Figure 2:
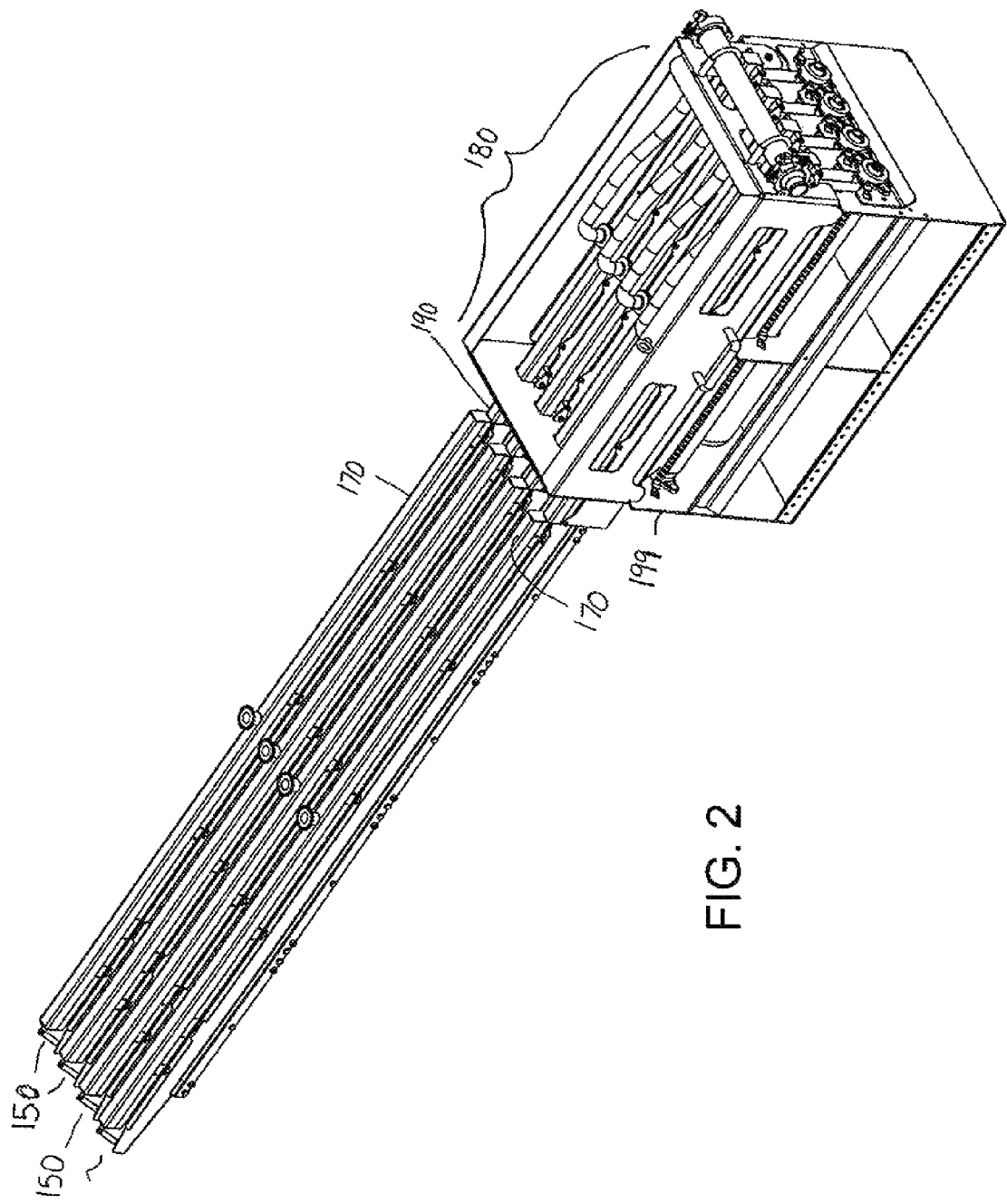
FIG. 2 is an isometric view of a deveining section of a deveining system having an array of deveining devices according to an illustrative embodiment of the invention.
Figure 3:
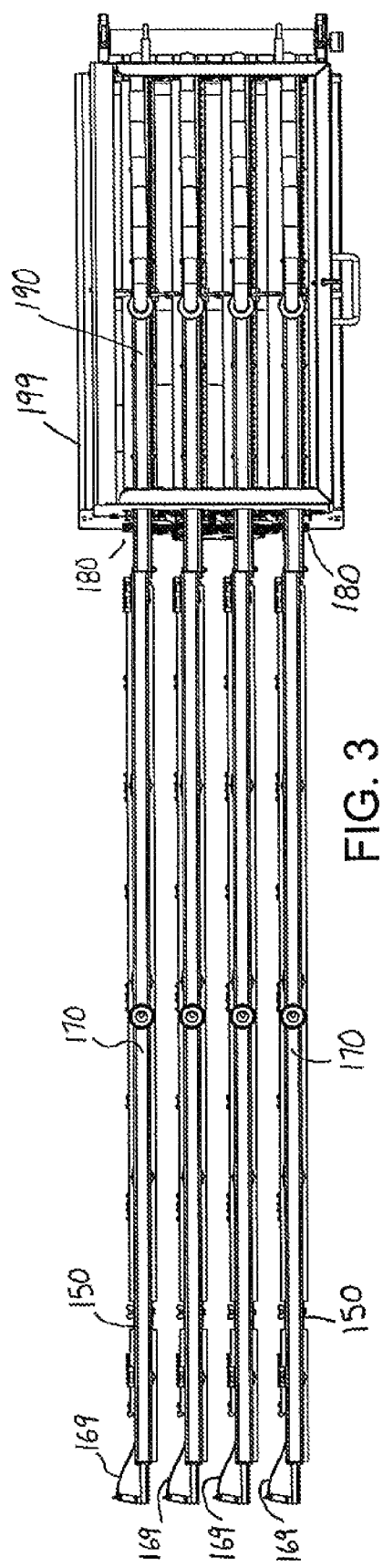
FIG. 3 is a top view of the deveining section of FIG. 2.
Figure 4:
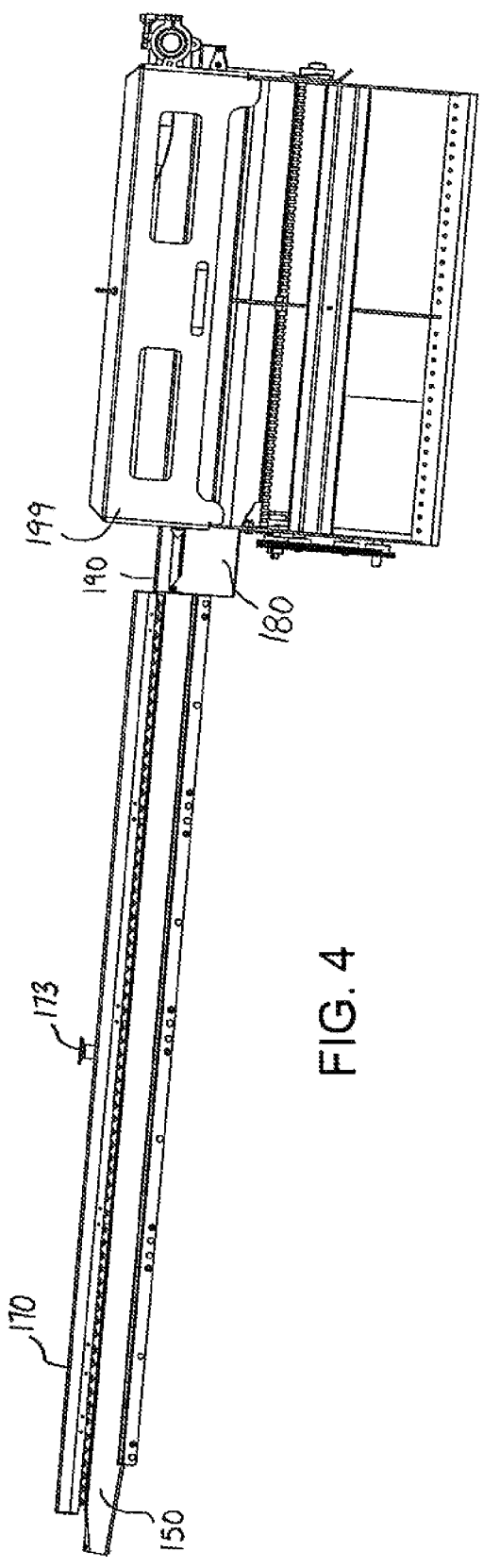
FIG. 4 is a side view of the deveining section of FIG. 2.
Figure 5:
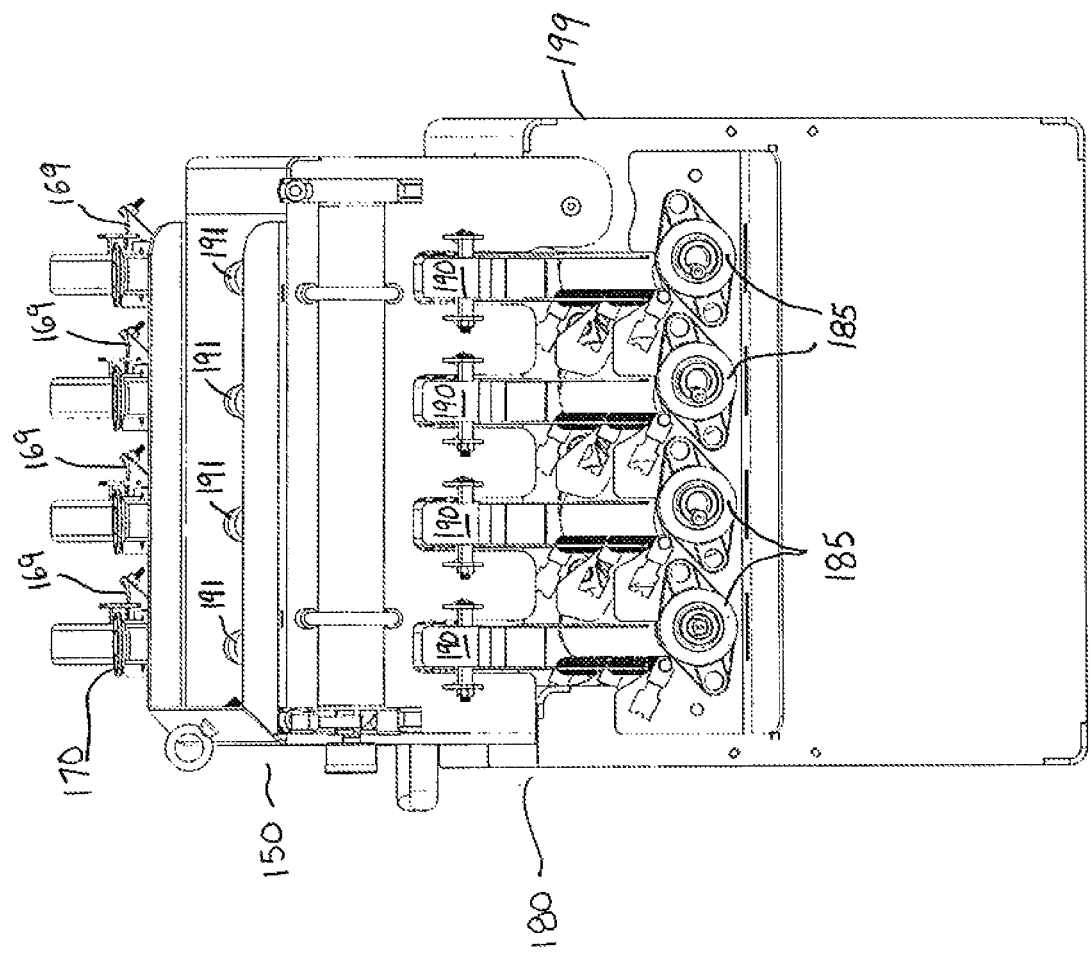
FIG. 5 is an end view of the deveining section of FIG. 2.
Figure 6:
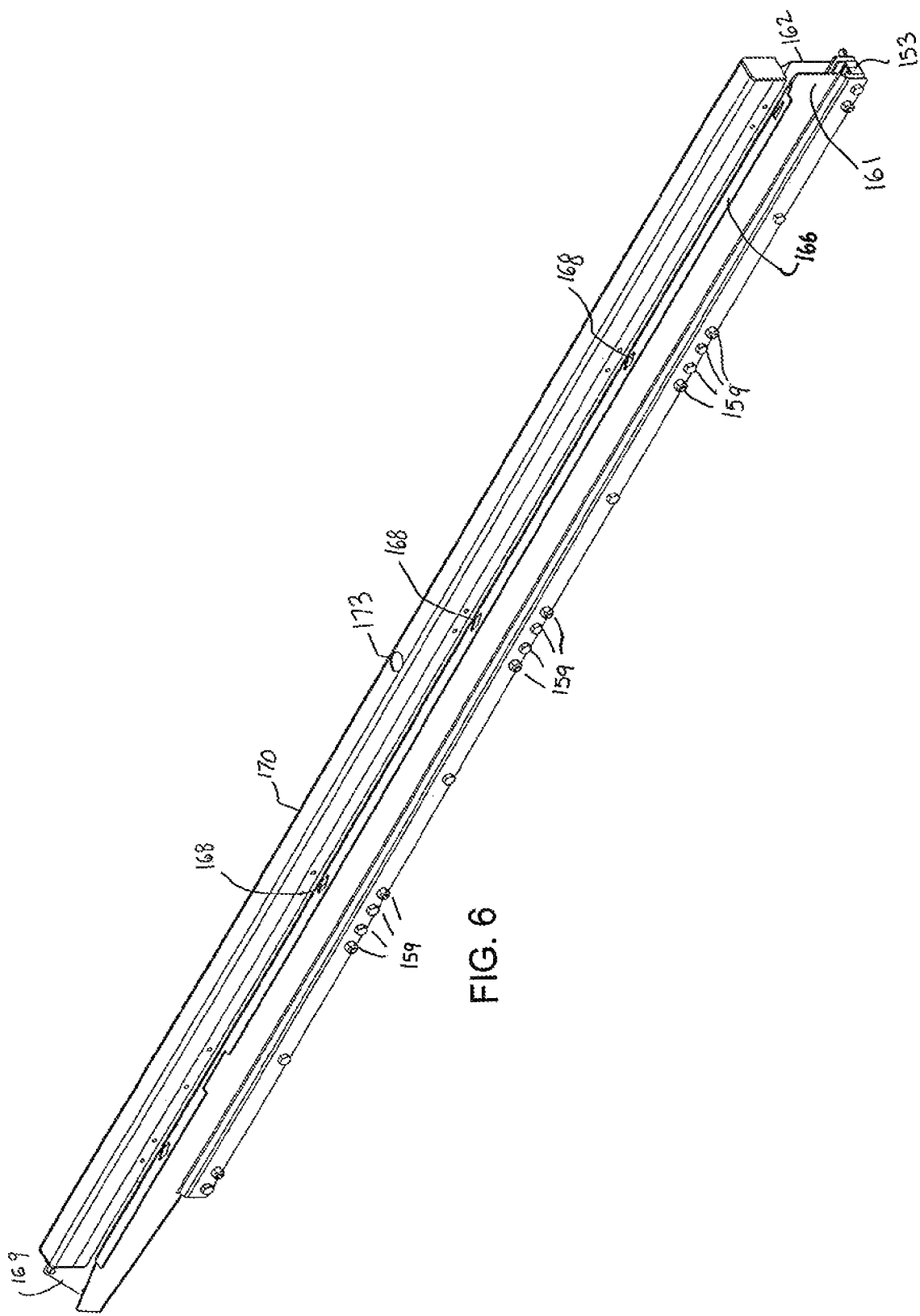
FIG. 6 is an isometric view of a slicing channel of the deveining section of FIG. 2.
Figure 9:
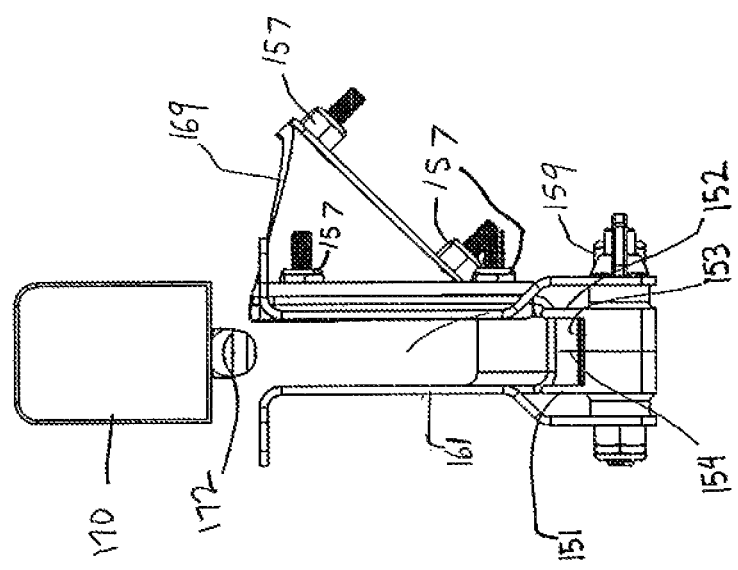
FIG. 9 is an end view of the slicing channel of FIG. 6.
Figure 10:
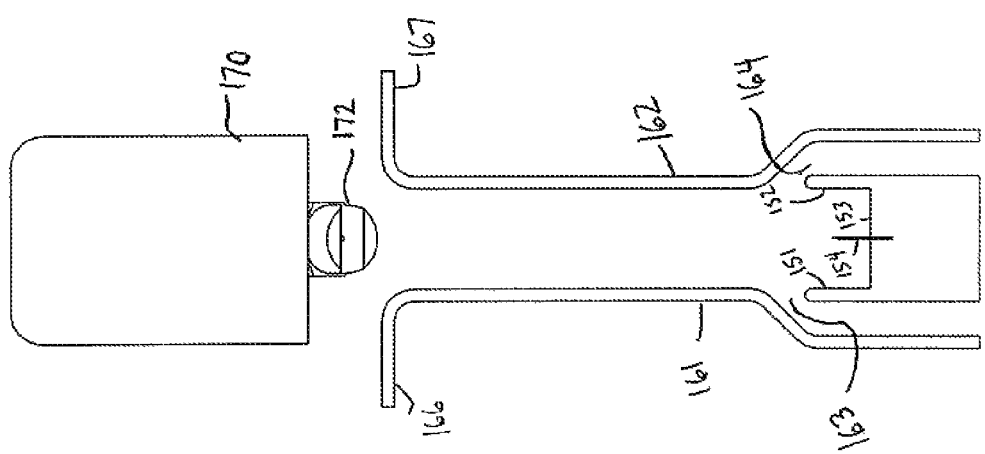
FIG. 10 is a cross-sectional end view of the slicing channel of FIG. 6.

FIG. 2 is an isometric view of a deveining section 140 of a deveining system according to one embodiment of the invention. FIG. 3 is a top view of the deveining section 140. FIG. 4 is a side view of the illustrative deveining section 140. FIG. 5 is an end view of the deveining section 140. The deveining section 140 includes an array of slicing channels 150 and an array of vein severing devices 180 in a frame 199. The illustrative deveining section 140 comprises four parallel slicing channels 150 in series with four parallel vein severing devices 180, though the deveining system may comprise any suitable number and configuration of channels and severing devices. The deveining section 140 also includes a first spray manifold 170 for providing a fluid spray to help propel a shrimp through a slicing channel 150 and a second spray manifold 190 above the severing section 180. Each slicing channel 150 holds shrimp in a vertical orientation and the fluid spray from the first spray manifold 170, or other suitable driver, applies a motive force to propel the shrimp through the slicing channel 150. Under the effect of the motive force, the vertically-held shrimp will roll through the different sections of the slicing channel 150, while a blade located in the slicing channel slices open the back of the shrimp, as described below.

FIGS. 6-10 show an example of a slicing channel 150 according to one embodiment of the invention. Each slicing channel may be a separate cartridge that can be removed from and inserted into the frame of the deveining system. Each illustrative slicing channel 150 comprises an inner channel formed by side walls 151, 152 and bottom wall 153. A blade 154 extends up from the bottom wall 153 for slicing open the backs of shrimp tumbling through the channel. The blade 154 may have any suitable size, shape and configuration suitable for slicing open the back of a shrimp or other crustacean. The illustrative inner channel and blade are linear, though the invention is not so limited. The side walls 151, 152 set a fluid level in the slicing channel 150, as described below.

The slicing channel 150 further includes outer side walls 161, 162 for holding the shrimp in the substantially vertical orientation. The outer side walls 161, 162 flank the inner side walls 151, 152. The outer side walls 161, 162 are wider in a base section and taper in an upper section to form overflow valves 163, 164 for allowing excess fluid to drain from the channel 150. In the illustrative embodiment, the outer side walls 161, 163 taper around the tops of the inner side walls 151, 152. Fluid in the channel therefore has a highest level set by the height of the inner side walls 151, 152. The overflow valves 163, 164 pull excess fluid through the bottom of the slicing channel 150, providing an additional force holding the shrimp in the vertical orientation within the slicing channel 150.

The outer side walls 161, 162 terminate at the upper end in tabs 166, 167, which allow coupling of the spray manifold 170 to the outer side walls 161, 162. Openings 168 in the upper tabs receive tabs or other fasteners associated with the spray manifold 170. The spray manifold 170 couples to the side walls to create a tight, cohesive unit.

The spray manifold 170 includes a plurality of spray nozzles 172 feed by a hose or other suitable device through an inlet 173. The spray nozzles may be spaced at any suitable distance along the length of the slicing channel 150 to provide a motive force propelling the shrimp through the channel. The nozzles are preferably orientated at an angle relative to the slicing channel. Preferably, the nozzles are angled between about 30° and about 60° with respect to the channel, and more preferably about 45° with respect to the channel. The nozzles emit sprays or streams of fluid, such as water, and direct the fluid through the slicing channel 150. The motive force applied by the nozzles propels the shrimp through the slicing channel and provides a downward cutting force on the shrimp. Water (or another fluid emitted by the nozzles) collects in the inner channel and provides a hydrodynamic force balance which keeps the shrimp in the center of the slicing channel 150. The spray may be adjusted, if desired.

The width of the slicing channel 150 may vary depending on the size of shrimp being deveined.

Figure 13:
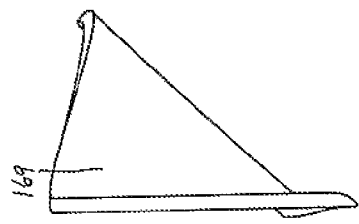
FIG. 13 is an end view of the transition side wall of FIG. 11.
Figure 12:
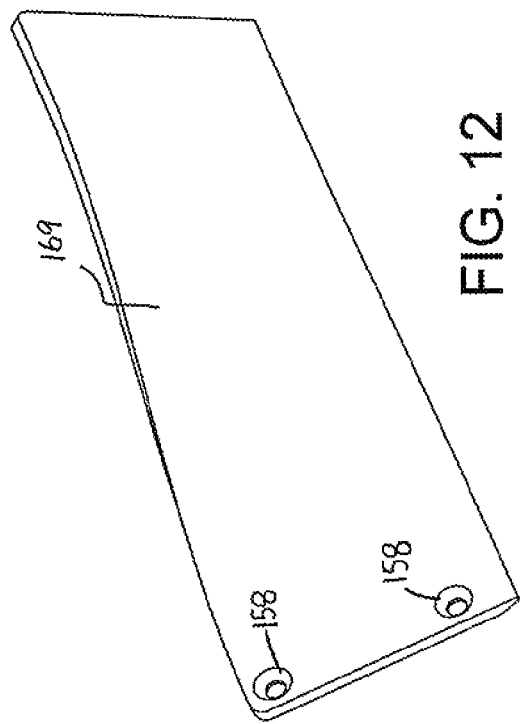
FIG. 12 is an isometric view of the transition side wall of FIG. 11.
Figure 11:
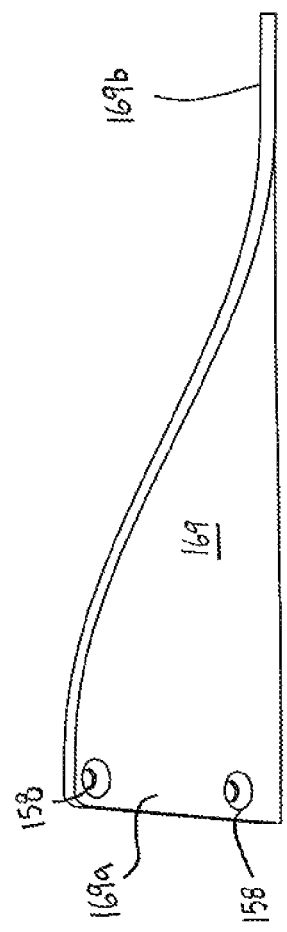
FIG. 11 is a side view of a transition side wall of the slicing channel of FIG. 6.

Each slicing channel 150 further includes a transition side wall 169, shown in FIGS. 11-13, comprising a torsioned wall. The transition side wall 169 receives the shrimp from the infeed at an angle and transitions the shrimp to a substantially vertical orientation. As shown, the upstream end 169a of the wall extends at an angle that matches an angle of a wall of the infeed and the wall twists to a vertical orientation at the downstream end 169b. The degree of twist depends on the angle of the walls of the infeed trough or device. In the illustrative embodiment, fasteners 157 pass through openings 158 in the transition side wall to integrate the transition side wall into the slicing channel. Alternatively, the transition side wall may be integral with an outer side wall 162, or coupled thereto through any suitable means.

The slicing channel 150 may comprise two halves that fit together around the blade 154. Fasteners 159 couple the two halves together, though other suitable coupling means may be used.

Figure 14:
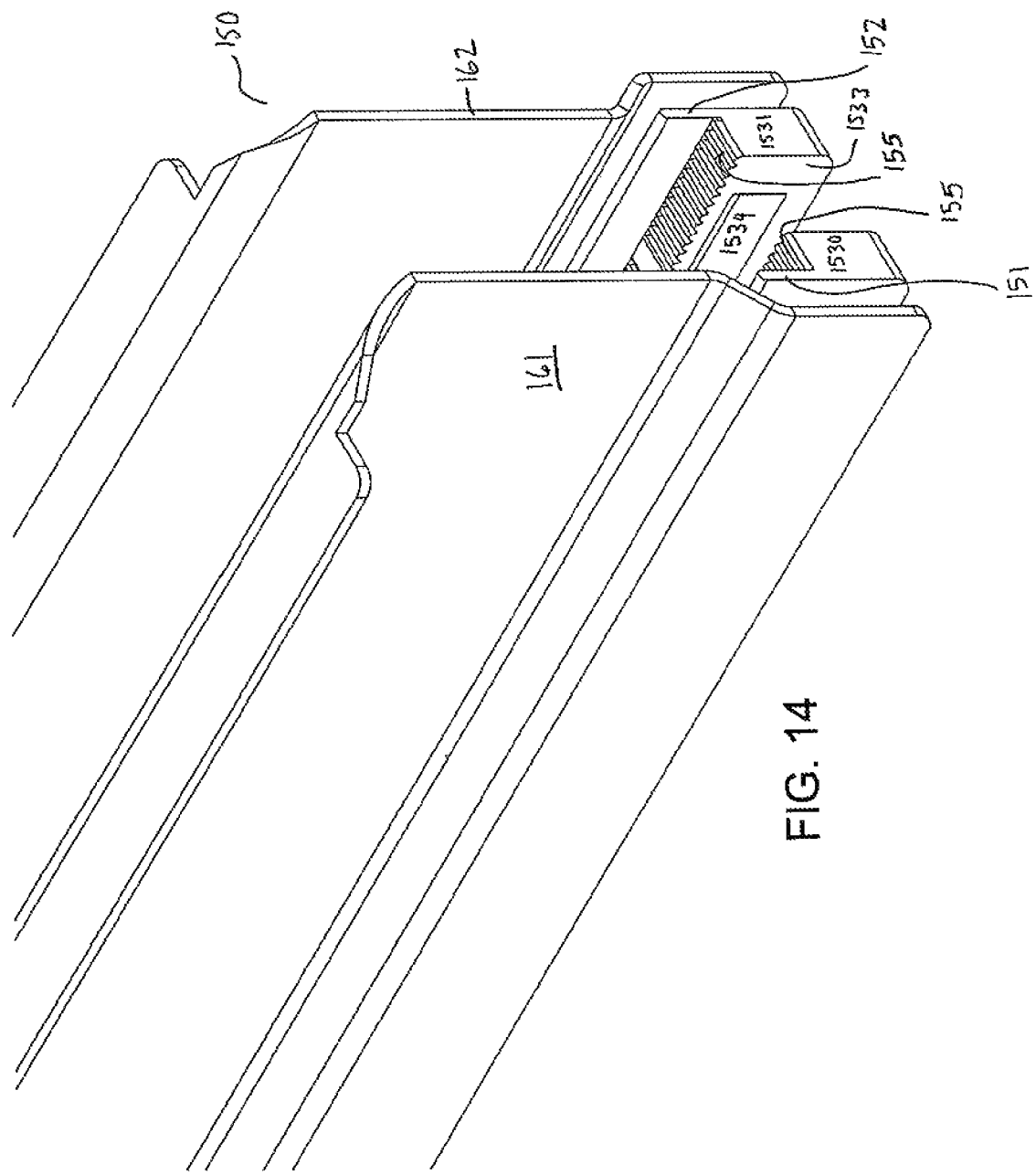
FIG. 14 is a detailed isometric view of an end of a slicing channel including stabilizers according to one embodiment of the invention.

As shown in FIGS. 14-16, the bottom wall 153 may include stabilizers 155 for stabilizing the shrimp. The illustrative stabilizer 155 comprises lateral teeth formed in the bottom wall 153 of inner channel. The stabilizer 155 may be integral with or separately formed from the bottom wall 153.

As also shown in FIG. 14, the inner channel may be formed by two components that couple together. The first component includes the first inner side wall 151 extending up from a base 1530. A second component comprises the second inner side wall 152 extending up from another base 1531. The second component may be a mirror image of the first component. The tops of the bases each form a half of the bottom wall 153 of the inner channel. The inner surface 1533 of each base 1530, 1531 includes a recess 1534 for receiving the blade 154. The bases couple together to sandwich the blade to form the inner channel, and the outer side walls 161, 162 flank the inner side walls to form the slicing channel 150.

When inserted in the frame of the deveining system, the slicing channel 150 may be oriented at an angle relative to horizontal to promote rolling of the shrimp as it enters the slicing channel. The angle may also increase the speed at which fluid from the nozzles flow. The illustrative trough preferably declines at an angle that is between about 0° and about 20° from horizontal, is more preferably at about 10° from horizontal.

To devein, the infeed device 12 passes a shrimp into a slicing channel 150, which orients the shrimp in a vertical orientation. The spray manifold 170 emits a spray, such as water, causing the shrimp to roll over the blade 154. The blade 154 slices the back of the shrimp open to expose the vein in the alimentary canal. The shrimp stays in a vertical rotation in a fluid bath provided by the nozzles in the manifold 170, which is favorable to the rolling action. The blade 154 may also extract the vein from the shrimp body.

Figure 17:
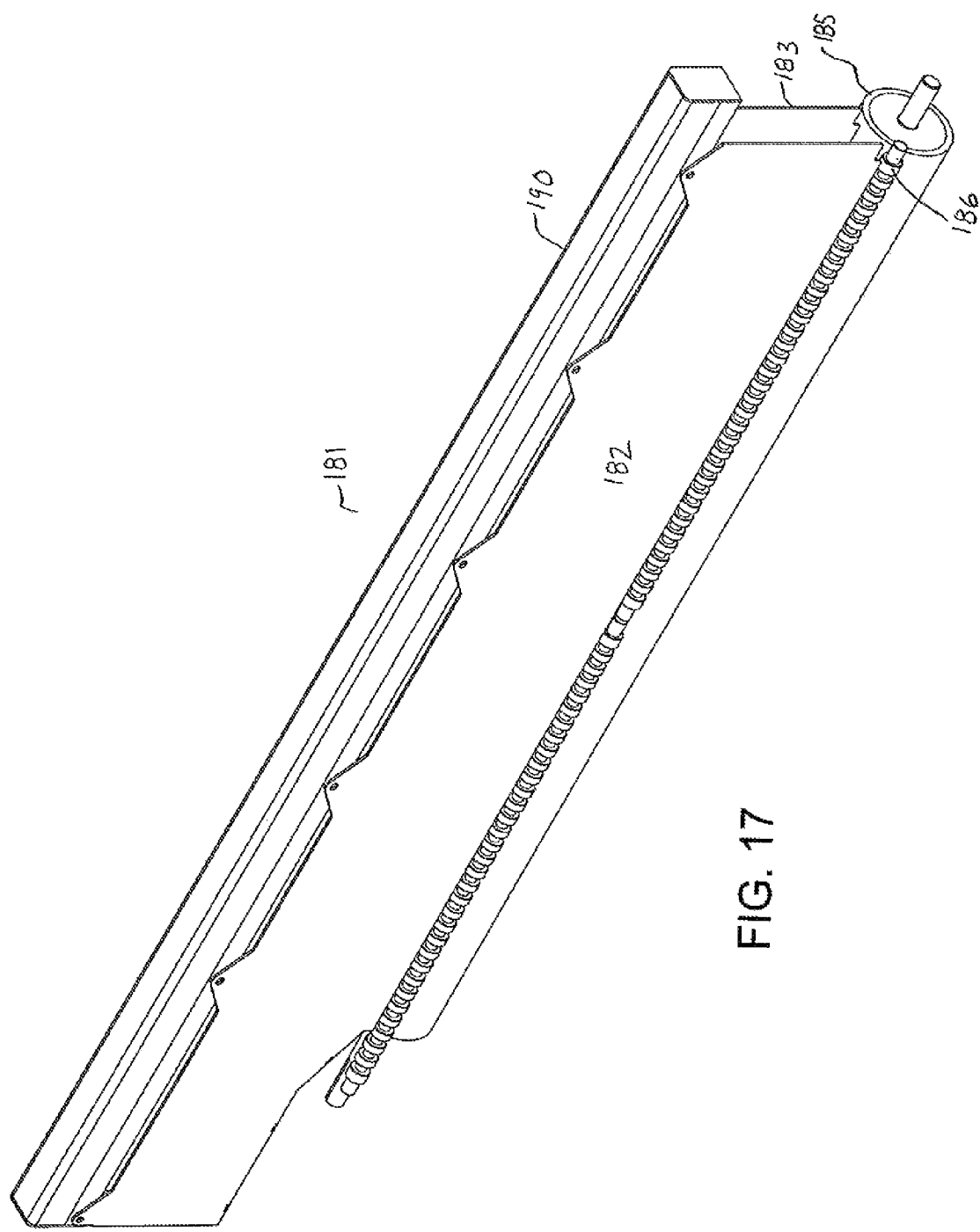
FIG. 17 is an isometric view of a vein severing channel of the deveining section of FIG. 2.
Figure 18:
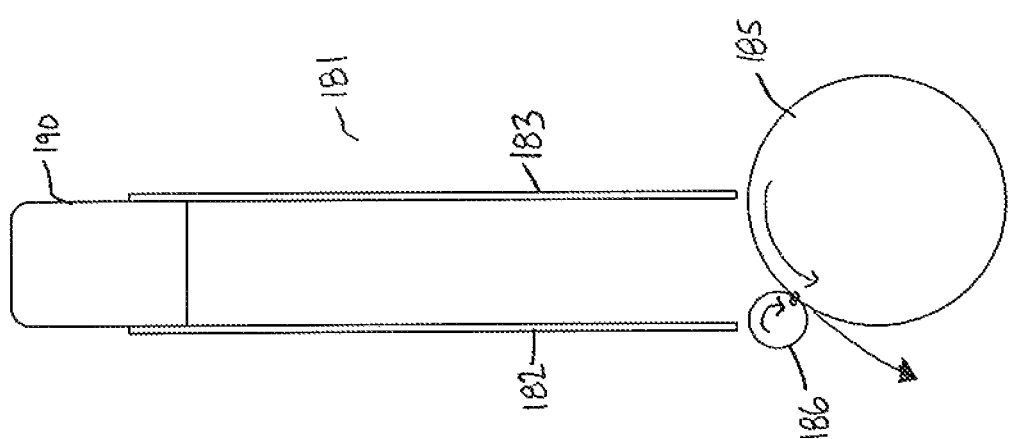
FIG. 18 is an end view of the vein severing channel of FIG. 17.
Figure 22:
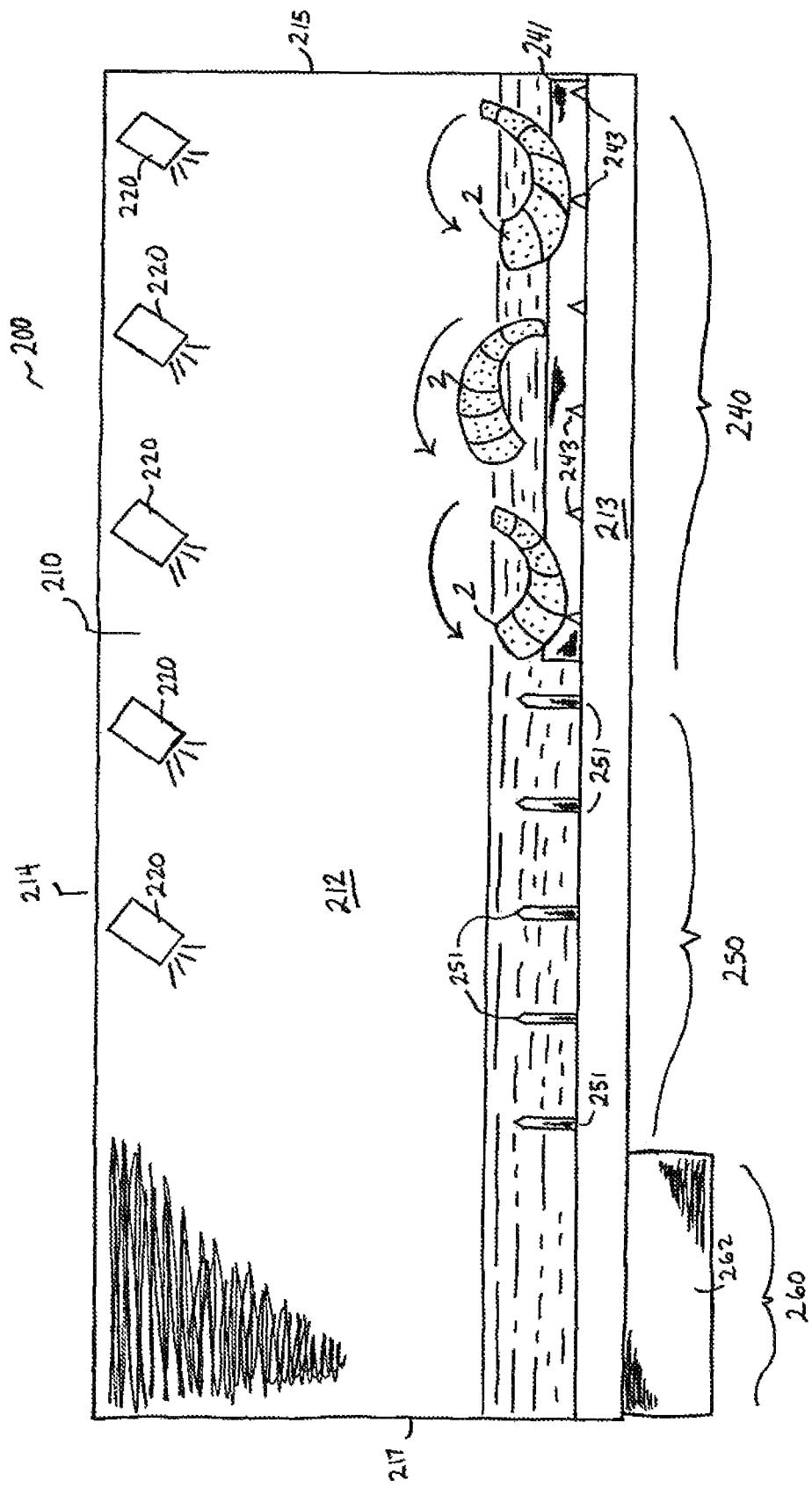
FIG. 22 is a side view of the deveining device of FIG. 21.

The sliced shrimp then passes from the slicing channel 150 to a lane in the vein severing section 180. FIGS. 17-19 illustrate an embodiment of a vein severing lane or channel 181 according to one embodiment of the invention. Similar to the slicing channel 150, the vein severing lane may comprise an insertable cartridge that is inserted into the frame 199 of the deveining system 10. In the illustrative embodiment, there is a 1:1 correspondence between the number of slicing channels 150 and vein severing lanes 181, though the invention is not so limited and multiple slicing channels may feed into a single vein severing lane, or a single slicing channel may feed multiple vein severing lanes.

Each vein severing lane 181 comprises a pair of walls 182, 183 connected to and hanging down from a spray manifold 190 including an array of spray nozzles. The illustrative walls 182, 183 in the vein severing lane are straight, though the invention is not so limited. The walls 182, 183 hold the shrimp in a substantially vertical orientation during the vein severing process. Inlet hoses 191 feed the spray manifold. The bottom of the lane is formed by a pair of rotating rollers 185, 186, which form a nip to grab the vein and sever it from the body of the shrimp. The rollers 185, 186 roll in the direction of the arrows to form a clamp pulling the vein through the nip. Deveined shrimp pass out the end of the lane 181.

In one embodiment, the pressure of the spray in the severing section 180 is greater than the pressure of the spray in the slicing section 150.

In the illustrative embodiment, the roller 185 comprises a large roller and the roller 186 is a smaller roller located about 45° from the top of the larger roller. The illustrative smaller roller 186 is knurled, as shown in detail in FIG. 20 to form gaps 187 facilitating the removal of veins. The smaller roller 186 may comprise a plurality of rollers in series or a single roller extending along the length of the lane.

FIGS. 21-25 illustrate an embodiment of deveining device 200 suitable for use in a deveining system according to another embodiment of the invention. The illustrative deveining device 200 comprises a channel, illustrated as linear trough 210 having substantially vertical side walls 211, 212 and a bottom wall 213. The illustrative trough has an open top 214, though the invention may alternatively comprise a closed channel. The trough 210 extends from a first end defining an inlet 215 to a second end defining an outlet 217. A shrimp, or other product requiring deveining, entering the trough is held in a vertical orientation by the side walls 211, 212. The trough 210 includes a series of sections for removing the vein from the shrimp. First, a slicing section 250 exposes a vein on a shrimp. The slicing section 250 may also extract the exposed vein from the alimentary canal. Alternatively, a separate vein extraction section 260 downstream of the slicing section 250 extracts the exposed vein from the alimentary canal of the shrimp. Then, a vein removal section 280 separates the vein from the body of the shrimp and passes the separated vein out of the trough. The deveining device further includes a driver, illustrated as nozzles 220, for applying a motive force to shrimp in the trough to propel the shrimp from the inlet 215 towards the outlet 217. Under the effect of the motive force, the vertically-held shrimp will roll through the different sections of the trough 210.

While the illustrative side walls 211, 212 are substantially vertical, the channel may alternatively have slightly angled side walls, or other suitably shaped walls for holding the rolling shrimp in a vertical orientation within the channel.

The inlet 215 comprises an opening in the upstream end of the trough 210 for passing shrimp from an infeed device, such as a feed tank, tray or other suitable device. Preferably, the infeed device passes a single shrimp at a time into the trough 210. A torsioned transition wall may transition the shrimp from a non-vertical orientation to a vertical orientation, as described above.

The slicing section 250 comprises a linear blade 241 extending along a first portion of the bottom 213 of the trough 210. In the illustrative embodiment, the linear blade 240 is between about 16 inches and about 83 inches and preferably between about 33 inches and about 66 inches and most preferably between about 35 inches and about 50 inches, though the blade may have any suitable length. Preferably, the length of the blade is greater than the circumference of the shrimp, to ensure contact between the blade and all points along the curved back of the shrimp. The linear blade 241 is preferably centered in the bottom of the trough, equidistant from each of the side walls 211, 212. The trough 210 further includes a stabilizer, illustrated as a series of pointed stubs 243 disposed along the linear length of the channel on each side of the blade 241. The stubs are spaced along the linear length at a distance that is between about 0.15 inches and about 0.5 inches apart and preferably between about 0.2 inches to 0.38 inches apart. The distance between the stubs may vary based on the size of the shrimp being deveined. Larger shrimp allow for a larger distance between stubs, while the stubs may be closer together for smaller shrimp. The stubs 243 may be spaced from the blade 241 by a distance that is between about 0.09 and about 0.4 inches and preferably between about 0.18 and about 0.3 inches. The stubs 243 are lower than the blade 241. The stubs 243 contact the meat of the shrimp on either side of the alimentary canal to help center the blade 241 over the alimentary canal and-or help roll the shrimp over the blade.

The stabilizer may have any suitable embodiment and is not limited to the pointed stubs 243. For example, the stabilizer may comprise one or more strips of laser cut metal with teeth cut into it.

The bottom of the trough 210 may be stepped to promote vertical orientation of the shrimp and to accommodate various sizes of shrimp.

The driver applies a motive force to the shrimp to facilitate turning of the shrimp within the channel. In the illustrative embodiment, the driver comprises a series of nozzles 220 positioned at the top of the trough 210. The nozzles are preferably orientated at an angle relative to the trough, as described above. The motive force applied by the nozzles propels the shrimp through the trough 210 and provides a downward cutting force on the shrimp. Water (or another fluid emitted by the nozzles) collects in the bottom of the trough and provides a hydrodynamic force balance which keeps the shrimp in the center of the trough. This enables the deveining device 210 to tolerate a large variation in shrimp width and still provide an attractive cut down the center of the shrimp's back.

The overhead nozzles pass through the open top end 214 of the trough 210. Alternatively, the top end 214 may include openings for housing the nozzles. The nozzles may be housed in a manifold located above or coupled to the trough 210.

In addition to the overhead nozzles 220, the deveining device may also include an entry nozzle 222 at the inlet end of the trough 210 for providing an entrance spray propelling the shrimp into and through the trough 210.

The series of nozzles 220 may extend along the entire length of the trough or a portion thereof.

The motive force applied by the nozzles 220, 222 can be adjusted to increase or decrease production speed.

The trough 210 may be oriented at an angle relative to horizontal to promote rolling of the shrimp as it enters the trough. The angle may also increase the speed at which fluid from the nozzle flows. The illustrative trough 210 preferably declines at an angle that is between about 0° and about 20° from horizontal, is more preferably at about 10° from horizontal.

In addition to slitting open the back of the shrimp, the linear blade 241 may also extract the vein from the alimentary canal after it is exposed. Alternatively, the channel may include a separate extraction section downstream from the cutting section 250. For example, the illustrative trough 210 includes a series of vertically oriented pointed posts 251 aligned with the blade 241 to form a separate extraction section. The pointed posts 251 are higher than the blade 241. The pointed posts are spaced apart by a separation distance that ranges from between about 0.25 inches to about 1 inch, and is preferably between about 0.25 inches and about 0.5 inches. The optimal separation distance depends on the size of the shrimp being deveined, with larger shrimp having a larger separation distance and smaller shrimp having a smaller separation distance. The pointed posts 251 are an optional component to the deveining device.

The vein removal section 280, downstream from the extraction section 250, includes a device for severing the extracted vein from the meat of the shrimp or other deveined product. In one embodiment, the vein removal device includes an opening 281 that is smaller than the shrimp being deveined and a pump 282 or other device for pulling the vein through the opening 281. The pump 282 severs the vein from the body of the shrimp and passes the severed vein to an exit of the pump. The vein removal device may alternatively comprise rotating rollers or another suitable clamping device for pulling the vein through the opening 281.

The illustrative outlet 217 of the trough 210 comprises an opening in the trough at the downstream end for passing the deveined shrimp.

The trough 210 may include drains in the bottom 213 of the trough 210 for allowing some of the fluid to drain. The drain may be located along the outside sides of the channel, near the side walls 211, 212 and-or towards the middle of the channel, so that the pull of the fluid through the drain helps center the rolling shrimp on the blade 241.

Figure 23:
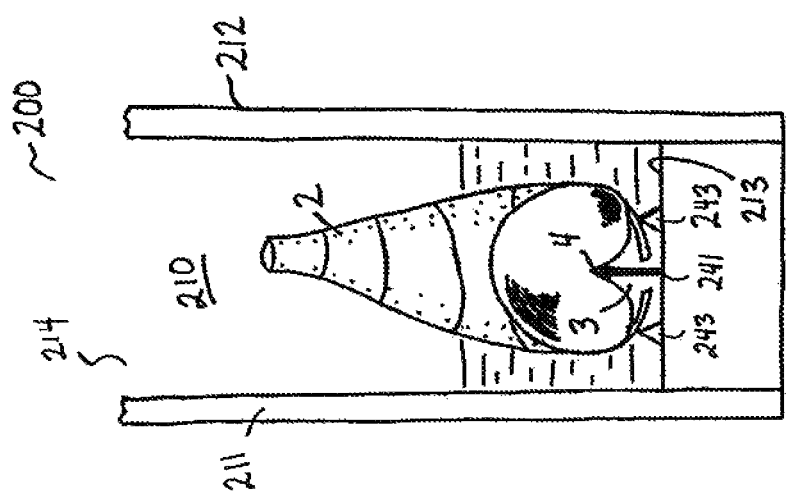
FIG. 23 is a cross-sectional front view of a slicing section of the deveining device of FIG. 22 during a deveining process.

FIGS. 22, 23, 24 and 25 illustrate a shrimp 2 being deveined using a deveining device of FIG. 21. The shrimp enters the trough 210 and begins to roll over the blade 241 under the influence of gravity and the motive force provided by the nozzles 220, 222. As shown in FIG. 23, the blade 241 slices the back 3 of the shrimp open to expose the vein 4 in the alimentary canal, while the stubs 243 hold the shrimp steady. The shrimp 2 stays in a vertical rotation in a fluid bath provided by the nozzles, which is favorable to the rolling action. The blade 241 may also extract the vein 4 from the shrimp body.

Figure 24:
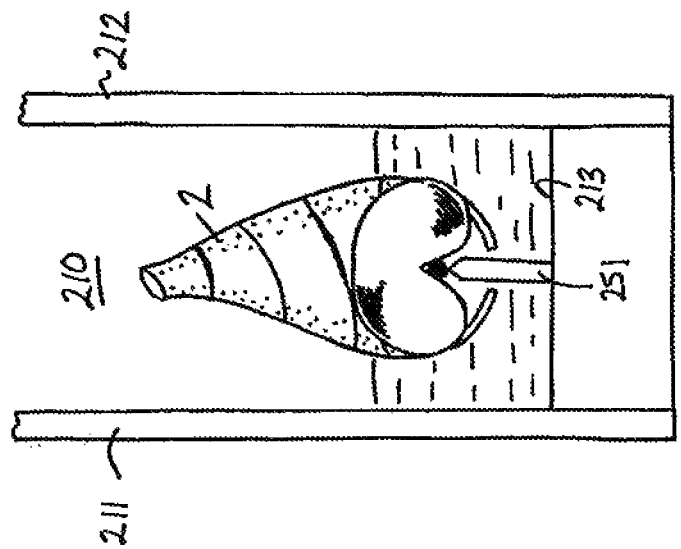
FIG. 24 is a cross-sectional front view of the deveining device of FIG. 22 in an extraction section during a deveining process.

Next, as shown in FIG. 24, the shrimp 2 optionally passes over the section of vertically oriented pointed posts 251 that open the cut back meat and extricate the vein 4 from the alimentary canal. While the pointed posts' primary function is to extricate the vein, the posts 251 can also completely remove the vein by snagging it with enough force to sever it from the shrimp meat. Alternatively, the pointed post section is omitted, and the blade 241 alone extracts the vein.

Figure 25:
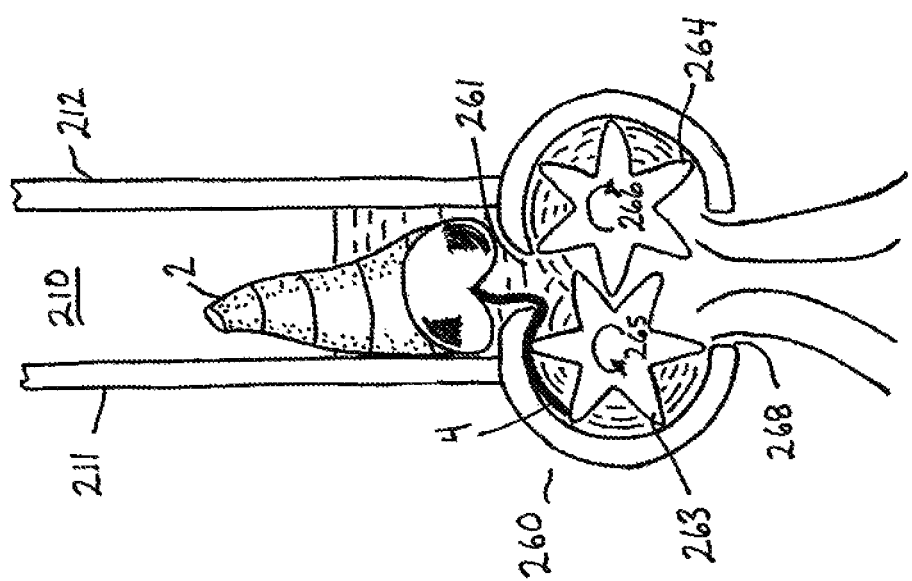
FIG. 25 is a cross-sectional front view of the deveining device of FIG. 22 in a vein removal section during a deveining process.

Then, as shown in FIG. 25, the shrimp 2, still in a fluid bath, passes over a pump 282 or other vein removal device. The pump 282 draws the exposed vein 4 through the opening 281 and severs the vein 4 from the shrimp meat. The size of the opening 281 prevents the shrimp 2 from passing through and contacting the opening. Because the shrimp do not touch the pump, the yield of the deveined shrimp is increased. The illustrative pump comprises dual impeller gears 283, 284, which are cylindrical in form, rotating in the direction of arrows 285, 286. The severed vein 4 passes through the exit 288 of the pump 282, along with fluid passing through the pump 282.

Figure 26:
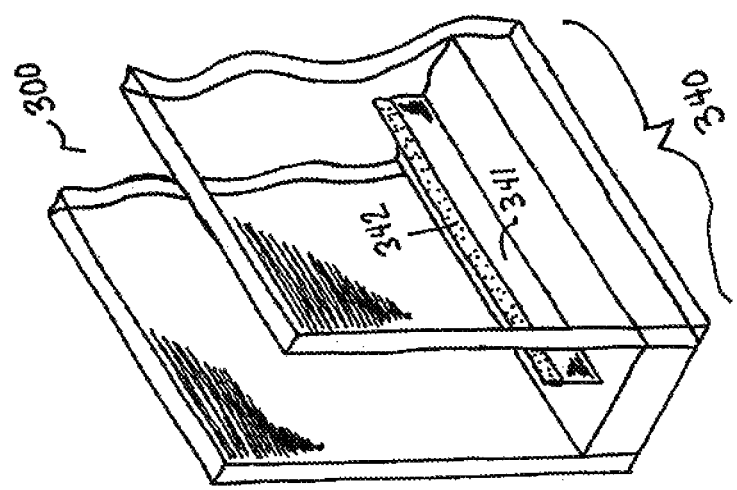
FIG. 26 is a partial perspective view of a slicing section of a deveining device according to another embodiment of the invention.

FIG. 26 illustrates a slicing section 350 of another embodiment of a deveining device 300. The linear blade 341 includes an abrasive edge 342 along the top edge of the blade to facilitate cutting through the tissue on the back of the shrimp. The abrasive edge 342 may be formed of diamond chips or another suitable material. In addition to exposing the vein, the abrasive edge may also extract the vein by wearing it away at its point of attachment with the shrimp.

Figure 27:
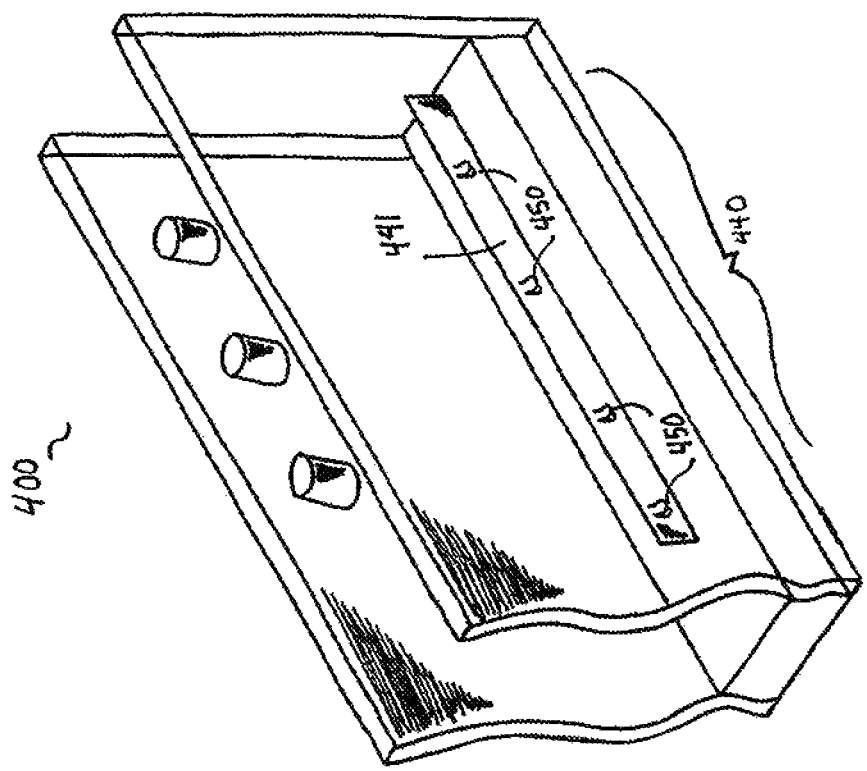
FIG. 27 is a partial isometric view of a combined slicing and extraction section of a deveining device according to another embodiment of the invention.

FIGS. 27, 28 and 29 illustrate a portion of another embodiment of a deveining device 400. The device 400 includes a combination slitting and extraction section 440 comprising a linear blade 441 with linear tabs 450 projecting at an angle from the sides of the blade. As shown in FIG. 28, the linear blade 441 slices open the tissue on the back of a shrimp 2 to expose the vein 4. A linear tab 450 catches the vein 4, as shown in FIG. 29. As the shrimp continues down the trough 410, the tab retains the vein, extracting the vein from the shrimp. The tabs 450 may serve as extractors alone. The linear tabs 450 may also entirely remove the vein from the body of the shrimp.

Figure 30:
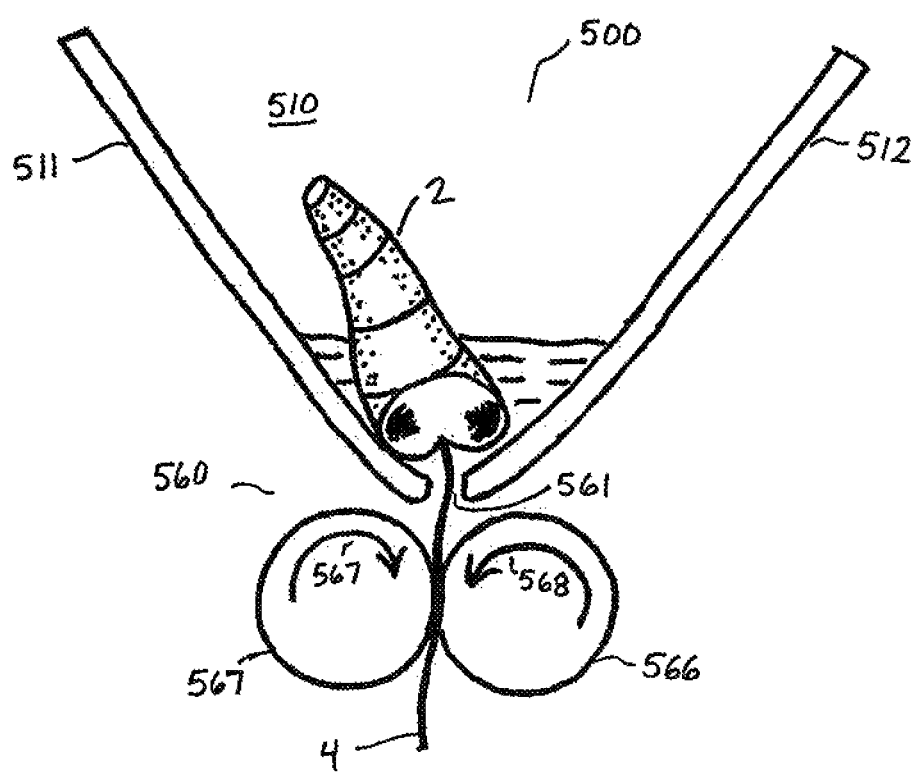
FIG. 30 is a cross-sectional end view of another embodiment of a deveining device having a v-shaped channel.

FIG. 30 is a cross-sectional end view of another embodiment of a deveining device 500 according to another embodiment of the invention. FIG. 30 illustrates the deveining device 500 in a vein removal section 560. The deveining device 500 includes a v-shaped channel 510 having angled side walls 511, 512 for holding the shrimp 2 in a fluid bath in a substantially vertical orientation. The device 500 also includes a cutting section and extracting section, or a combined cutting and extraction section, (not shown) upstream of the vein removal section. The vein removal section 560 comprises an opening 561 in the bottom of the channel 510 that is smaller than the shrimp 520. A pair of cylindrical rollers 565, 566 that rotate in the direction of arrows 567, 568 is disposed below the opening 561. The rollers form a clamp. The rollers 565, 566 grab the vein 521 hanging from the shrimp body and sever it from the body, passing the severed vein below the rollers.

Figure 31:
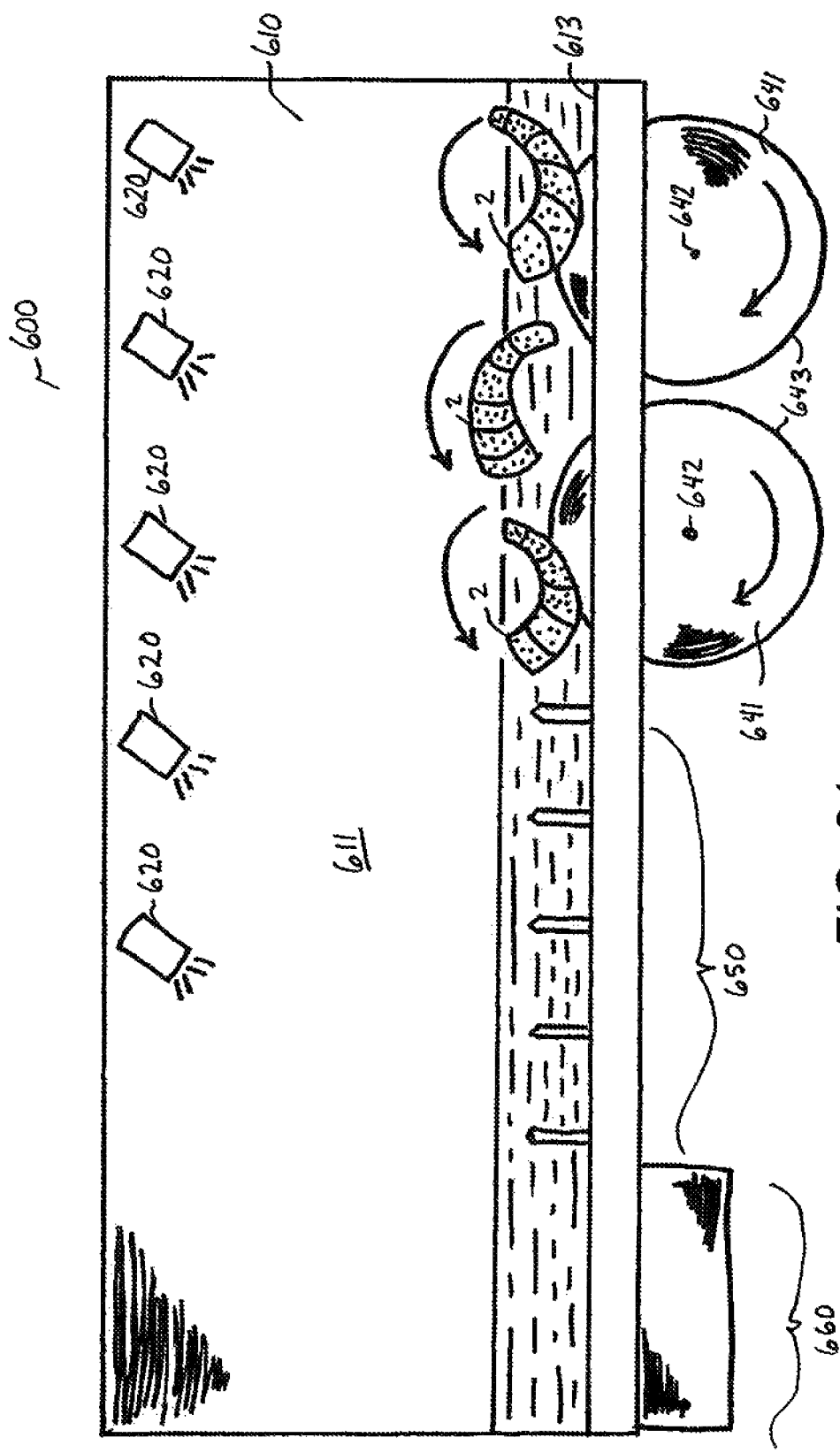
FIG. 31 is a side view of another embodiment of a deveining device having circular cutting blades.
Figure 32A:
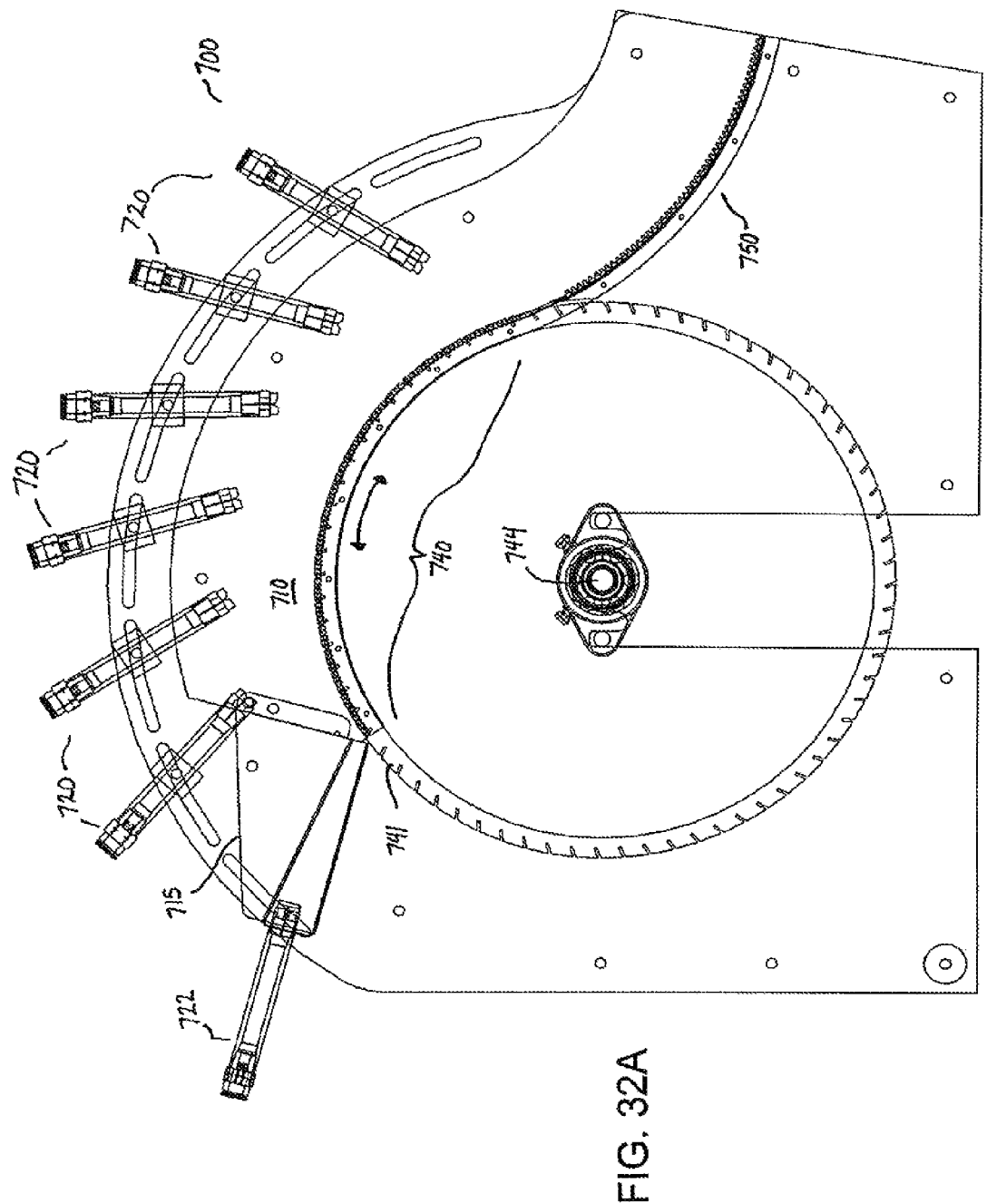
FIG. 32A is a side view of another embodiment of a deveining device comprising an arched channel and a rotary blade.
Figure 32B:
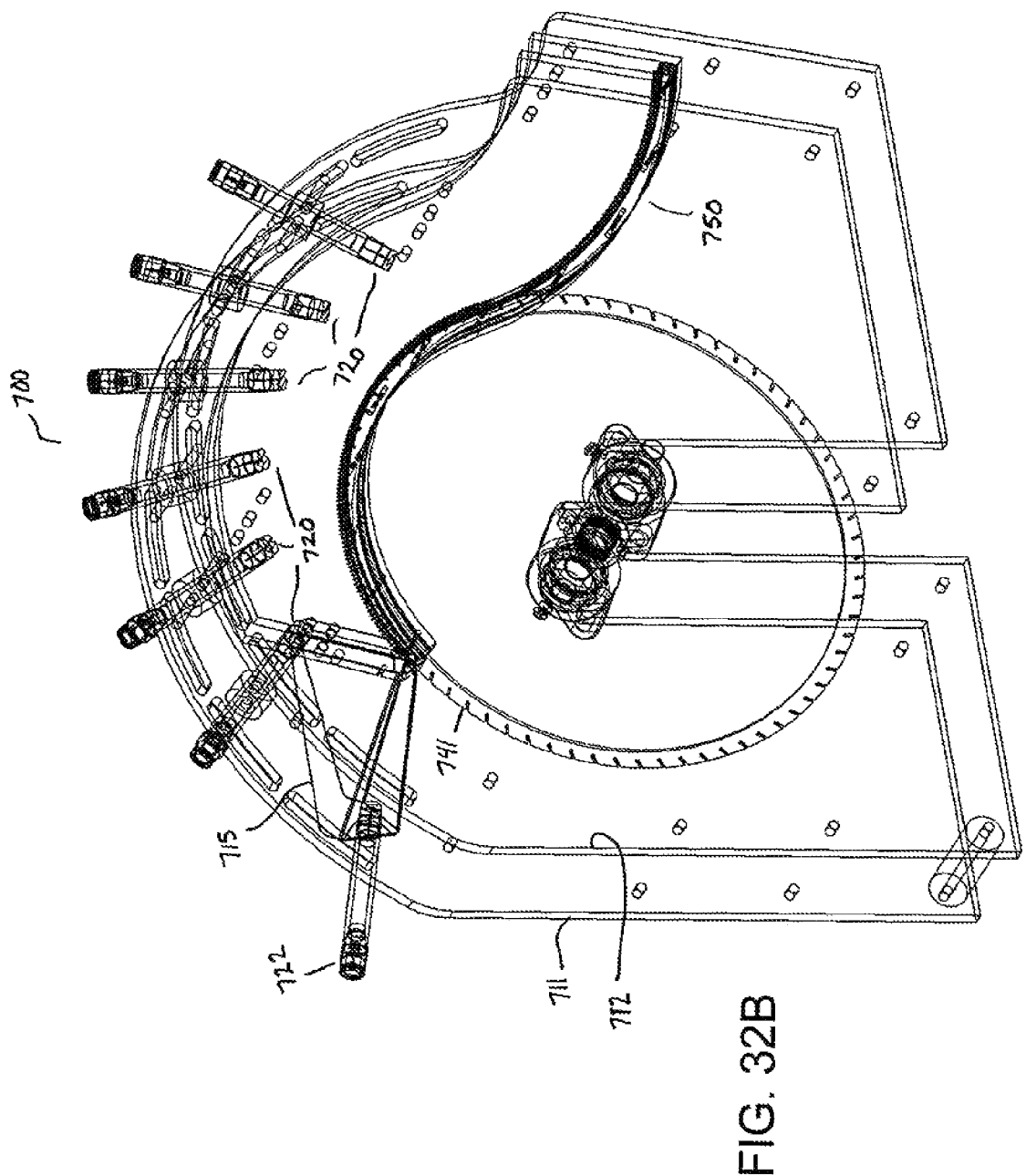
FIG. 32B is an isometric view of the deveining device of FIG. 32A.

FIG. 31 is a side view of another embodiment of a deveining device 600 suitable for removing the vein of shrimp or other creatures. The device 600 includes a linear channel 610 having side walls 611 for holding a shrimp in a substantially vertical orientation. In one section of the channel, circular blades 641 protrude from the bottom 613 of the channel 610. The circular blades 641 have curved cutting edges 643, and may rotate about a central axis 642 to facilitate cutting of a shrimp 2 rolling through the channel. The circular blades may also or alternatively extract and-or remove the vein from the shrimp. The deveining device 600 also includes a driver, illustrates as an array of nozzles 620, for propelling rolling shrimp 2 through the channel 610. The illustrative deveining device 600 further includes a separate extraction section 650 and a separate vein removal section 660, though these components may alternatively be integrated into the cutting section 640 formed by the blades 641 or integrated with each other, or omitted.

FIGS. 32A-38 show another embodiment of a deveining device 700 and its components. The deveining device 700 of FIGS. 32A and 32B includes an arched channel 710 for holding shrimp or another object to be deveined in a substantially vertical orientation. A blade 741 having a curved cutting edge matching the profile of the channel 710 protrudes through the bottom of the channel to form a slicing section 740 for exposing a vein of a shrimp rolling through the channel. The blade 741 may be a circular blade that rotates in either direction about a shaft 744. Nozzles 720 are disposed relative to the channel 710 to cause a shrimp to roll through the channel, over the blade 741. The rotating blade 741 slices through the tissue on the back of the shrimp to expose and, optionally, extract, the vein in the alimentary canal. The channel 710 may also include a separate extraction section and-or removal section.

The illustrative blade 741 rotates at a rate of between about 100 and about 1000 revolutions per minute, though the invention is not limited to this range.

The deveining device 700 includes an inlet chute 715 for providing a shrimp or other product to be deveined to the channel 710. An inlet nozzle 722 provides an initial propelling spray to the shrimp.

Figure 33:
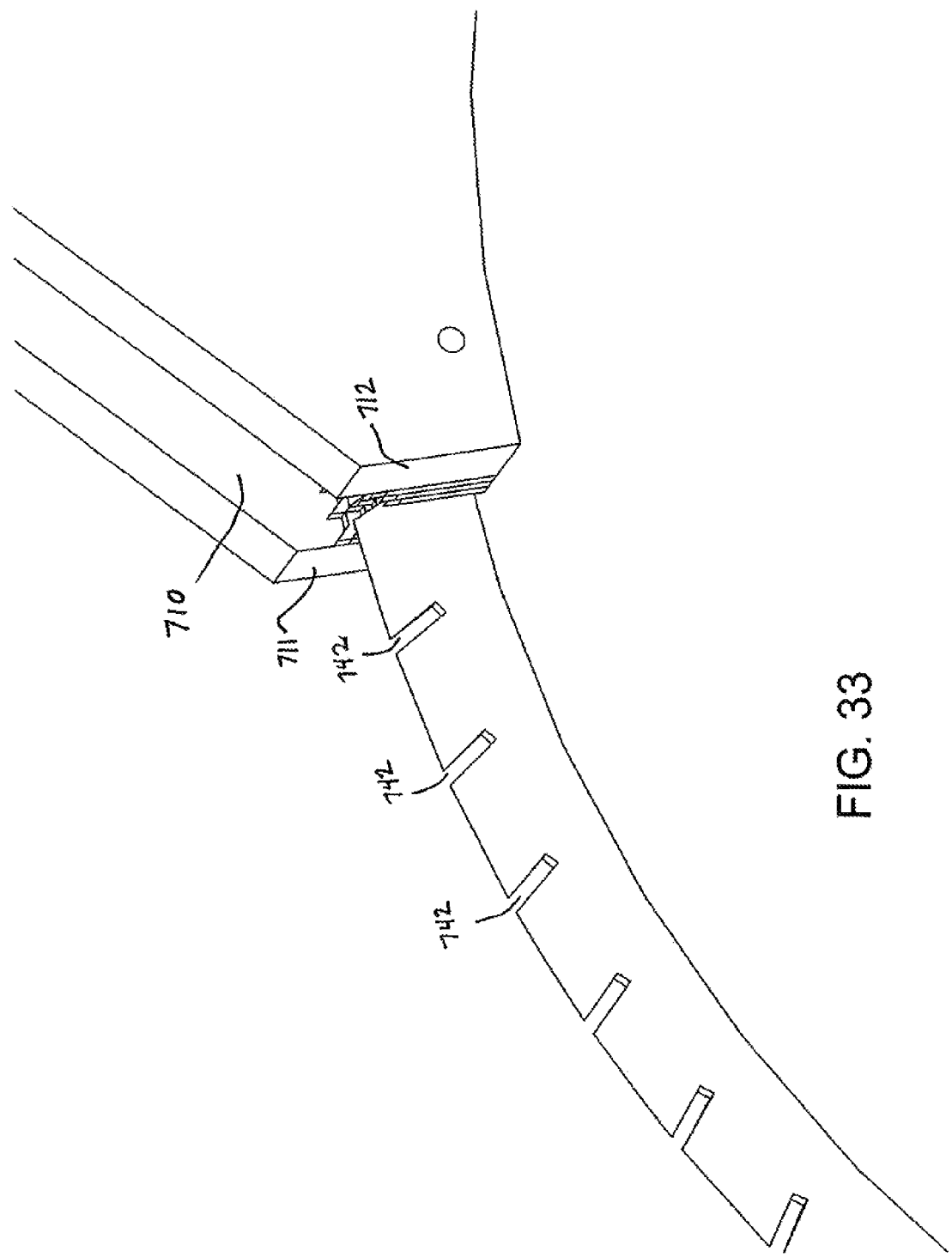
FIG. 33 is a side view of the blade of the deveining device of FIGS. 32A and 32B.

In the slicing section 740 of the device 700, the blade 741 rotates to cut open the back meat of a shrimp rolling through the channel. As shown in FIG. 33, the blade 741 may include slanted grooves 742 to facilitate cutting of the shrimp and possibly shearing of the vein from the shrimp entirely.

Figure 34:
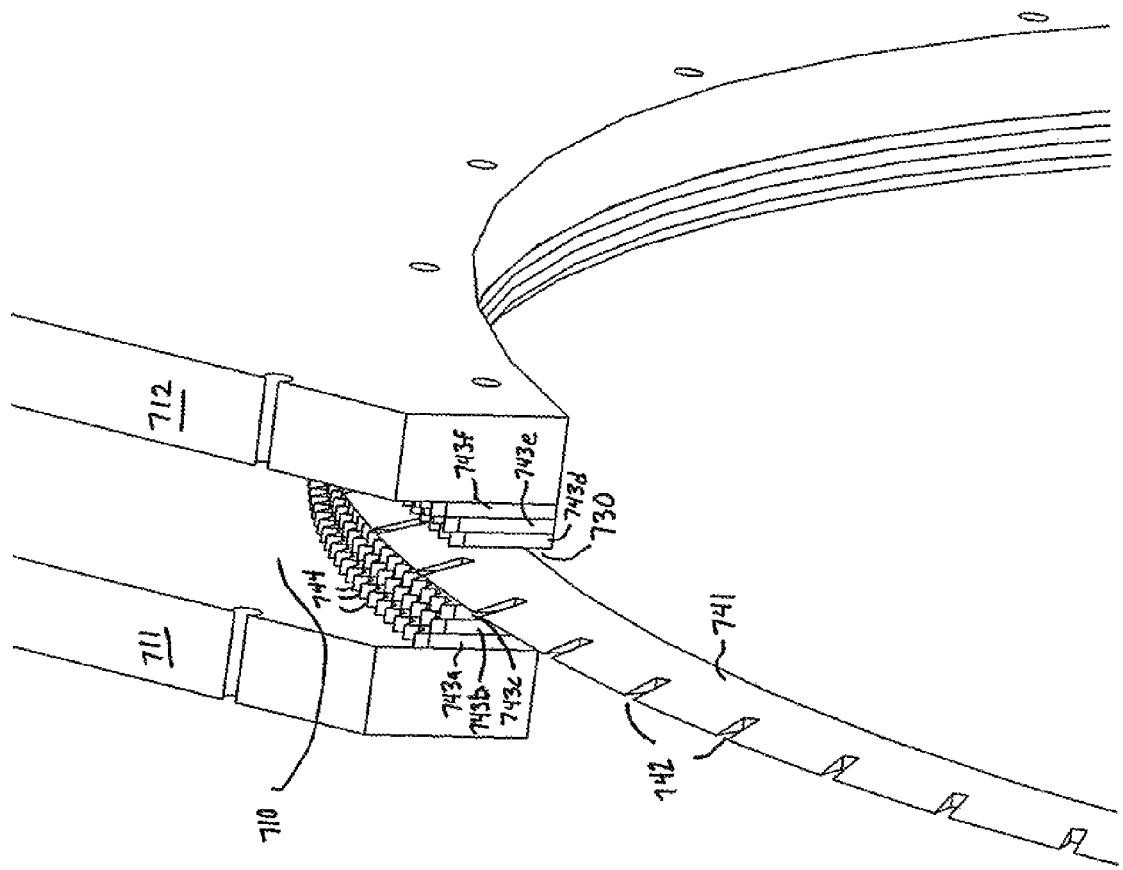
FIG. 34 is a close-up view of the channel, blade and stabilizers of the deveining device of FIGS. 32A and 32B.

FIG. 34 is an isometric close-up view of the channel 710 of the deveining device 700. The channel 710 is formed by two side walls 711, 712, which may be plastic or another suitable material. The blade 741 protrudes through the bottom of the channel 710. The channel may further include stabilizers on either side of the blade 741. The illustrative stabilizers comprise strips 743a-f of laser cut metal. The strips include teeth 744 for contacting the shrimp. The teeth 744 help stabilize the shrimp and facilitate rolling of the shrimp through the channel.

Figure 35:
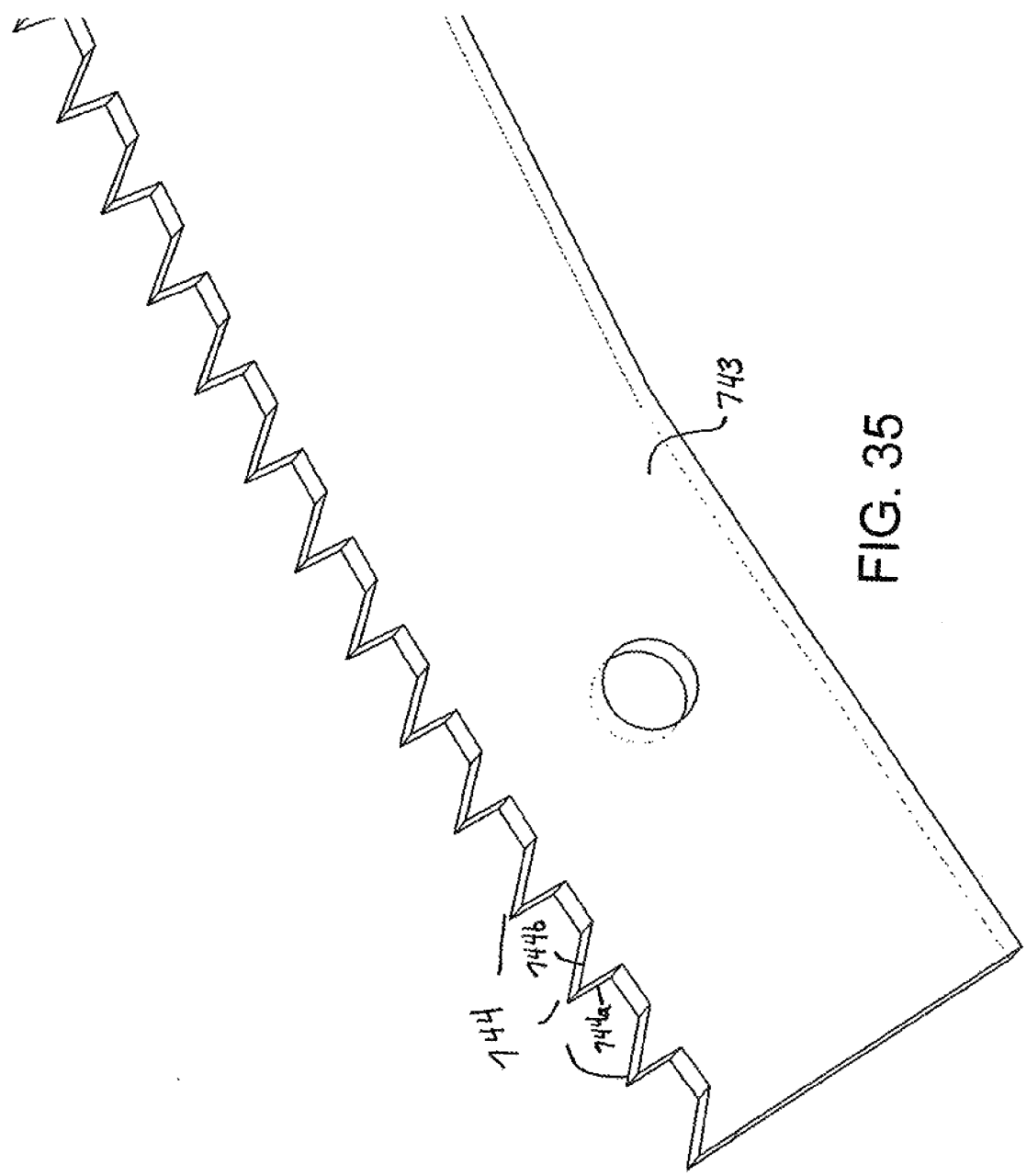
FIG. 35 is a side view of the stabilizers of the deveining device of FIGS. 32A and 32B.

As shown in FIG. 35, the teeth 744 have a buttress thread configuration, with a vertical front face 744a and an inclined back face 744b. As shown in FIG. 34, the strips have graduated heights, with the outer strips 743a, 743f highest, and the inner strips 743c, 743d lowest to form a stepped channel bottom. The stepped bottom allows the channel to cradle the shrimp over the blade 741, regardless of shrimp size. The inner strips 743c, 743d are spaced from the blade 641 to form drains 730 for draining fluid through the bottom of the channel 710. As fluid drains through the drains 730, the suction created by the fluid may help draw the shrimp against the blade 741.

Figure 36:
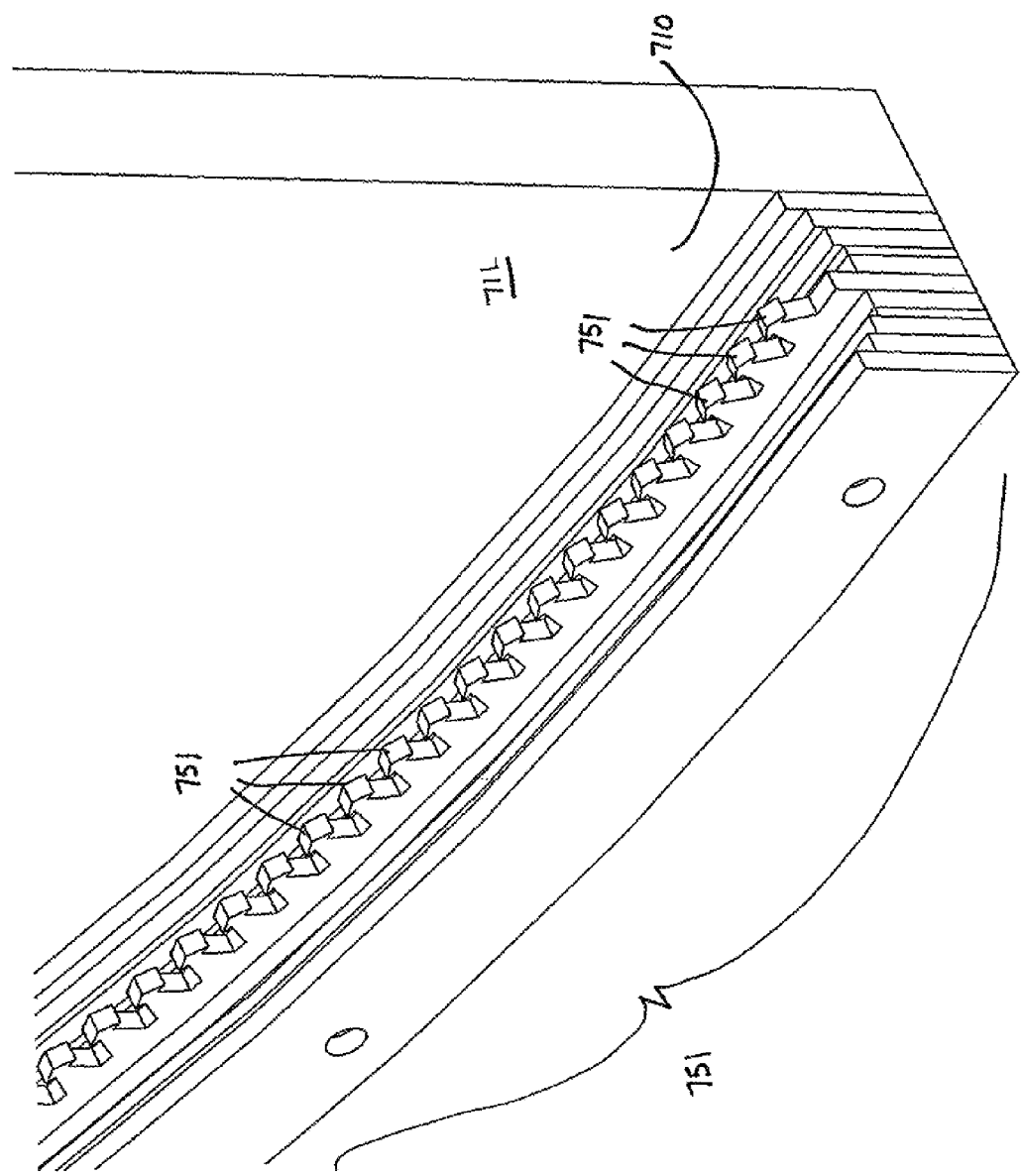
FIG. 36 is an isometric view of an outlet end of the deveining device of FIGS. 32A and 32B, with a side wall of the channel removed.
Figure 37:
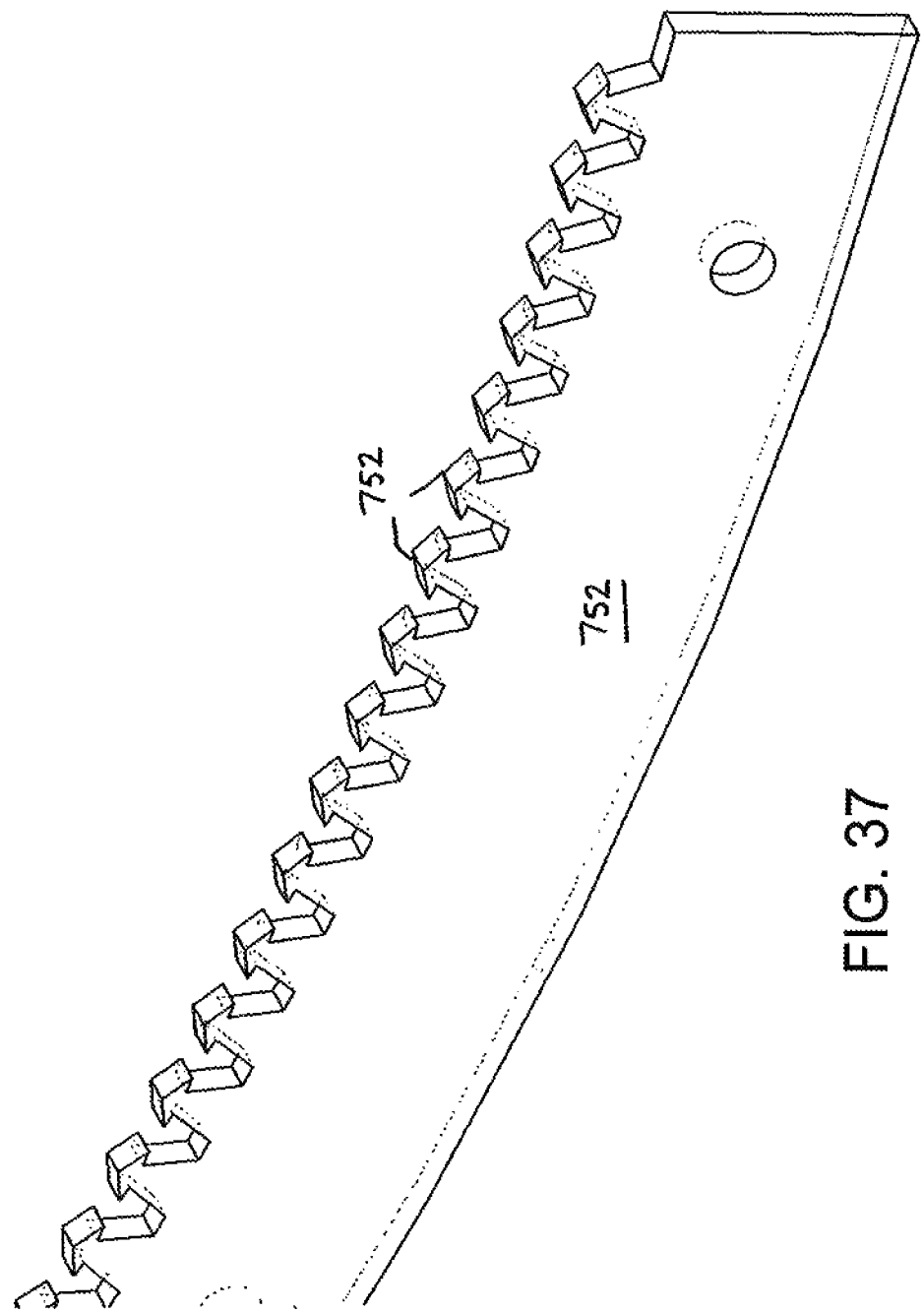
FIG. 37 is an isometric view of the barbs in the extraction section of the deveining device of FIGS. 32A and 32B.

Referring back to FIGS. 32A and 32B, the deveining device 700 further includes a second section 750 for removing any veins remaining after the shrimp passes over the rotating blade 741. The extraction section 750, a portion of which is detailed in FIG. 36, comprises a series of barbs 751 projecting from the bottom of the channel 710. The barbs 751 may be integrally formed from a strip of metal 752, as shown in FIG. 37, or may be formed from another material or method. The bottom of the channel in the extraction section 750 may be stepped, as shown in FIG. 36. The barbs may, in one embodiment, twist.

Figure 39:
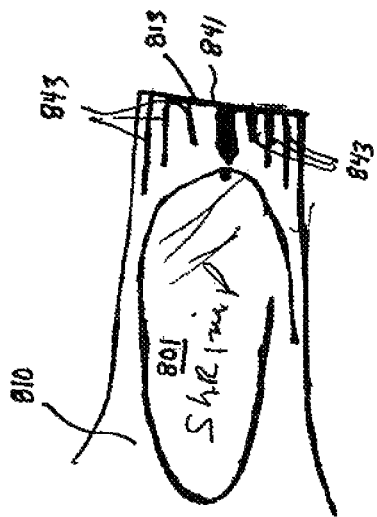
FIG. 39 is a cross-sectional, detailed view of a channel of the deveining device of FIGS. 38A and 38B.
Figure 38A:
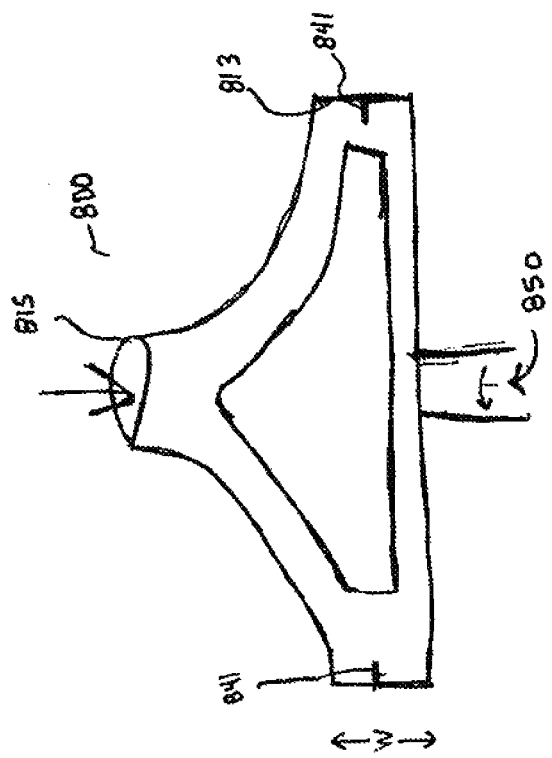
FIG. 38A is a top view of a deveining device according to another embodiment.
Figure 38B:
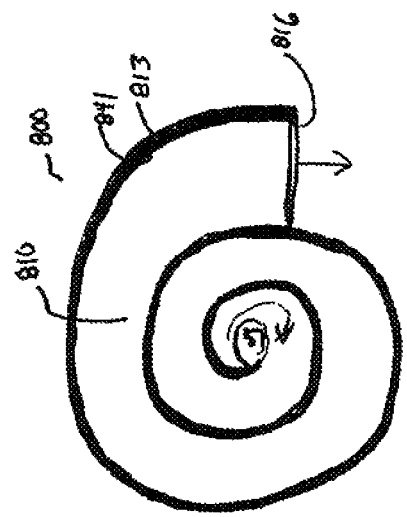
FIG. 38B is a cross-sectional front view of the deveining device of FIG. 38A.

FIGS. 38A and 38B show a deveining device 800 according to another embodiment of the invention. The illustrative device includes a spiral channel 810 having a cutting blade 841 protruding into the interior of the channel from an outer wall 813. The deveining device has a nautilus shape, with a central inlet 815 and an outer outlet 816. The deveining device 800 is mounted on a central shaft 850, which rotates about a central axis to rotate the deveining device. The rotation of the spiral channel 810 about the shaft provides a motive force to cause a shrimp 801 to roll through the spiral channel 810. The centrifugal force provided by the rotation pushes the rolling shrimp 801 against the cutting blade 841 to cause the blade to slice open the back meat of the shrimp and expose the vein of the shrimp. The cutting blade may also extract and-or remove the vein from the shrimp body. FIG. 39 is a close-up view of a portion of the spiral channel 810 including a rolling shrimp 801 being deveined. As shown, the cutting blade 841 protrudes from an outer wall 813 of the spiral channel. Stabilizers 843 may be disposed to the side of the cutting blade 841. The stabilizers 843 may be stepped so that the channel 810 cradles the shrimp.

In one embodiment, the width W of the channels 810 may be adjusted based on the size of shrimp being deveined.

An alternative embodiment of the linear or rotary blade to cut the shrimp backs in a deveining device is to excite the blade to add vibratory or stroking movement to the blade, which increases cutting efficiency. For example, the blade may be coupled to an ultrasonic unit to induce vibration.

The illustrative blade profile is smooth and straight. Alternatively, the blade may have a scalloped or serrated edge.

While the illustrative deveining devices of FIGS. 21-39 comprise a single channel, the deveining device may comprise multiple parallel channels, as shown in FIG. 2-19 having slitting, extraction and-or removal sections to increase throughput capacity as needed.

The shrimp emerge from the channel de-veined, retaining a pleasing aesthetic quality, and maximum yield due to the very limited trauma incurred by passing through the channel, versus current deveiners on the market. Current deveiners employ a far more aggressive agitation action to remove the vein, which results in poor aesthetics and a marked yield reduction. The present deveining device produces an aesthetically superior product by using a less aggressive method of removing the vein than the current automated standard.

The deveining device of the present invention is also capable of a larger throughput capacity on a smaller footprint due to its compact size and ability to accelerate the shrimp with water pressure to increase process speed.

Although the invention has been described in detail with reference to a few exemplary versions, other versions are possible. So, as these few examples suggest, the scope of the claims is not meant to be limited to the versions described in detail.

What is claimed is:

1. A shrimp deveining device comprising:
   a channel having an inlet, outlet, and walls for holding a shrimp in a substantially vertical orientation;
   a driver for causing the shrimp to roll through the channel; and
   a blade protruding from a wall of the channel for slicing open back meat of a shrimp rolling through the channel to expose the vein of the shrimp.
2. The shrimp deveining device of claim 1, wherein the blade and channel are linear.
3. The shrimp deveining device of claim 1, wherein the blade vibrates.
4. The shrimp deveining device of claim 1, wherein the blade includes an abrasive cutting edge.
5. The shrimp deveining device of claim 1, further comprising:
   a series of pointed posts downstream of the blade for extracting the exposed vein from the shrimp.
6. The shrimp deveining device of claim 1, further comprising a vein remover downstream of the blade for severing the vein from the shrimp body.
7. The shrimp deveining device of claim 6, wherein the vein remover comprises an opening in the bottom of the channel and a pump for pulling the vein through the opening.
8. The shrimp deveining device of claim 6, wherein the vein remover comprises a lane in series with the channel having a bottom formed by rotating rollers forming a clamp.
9. The shrimp deveining device of claim 8, wherein one of said rotating rollers is knurled.
10. The shrimp deveining device of claim 1, wherein channel extends at a decline relative to horizontal, with the inlet higher than the outlet.
11. The shrimp deveining device of claim 1, wherein the driver comprises a series of overhead nozzles emitting fluid at the top of the channel.
12. The shrimp deveining device of claim 11, wherein the overhead nozzles are angled relative to the channel.
13. The shrimp deveining device of claim 11, further comprising an entry nozzle for emitting fluid at the inlet.
14. The shrimp deveining device of claim 1, wherein the walls comprise a pair of substantially vertical side walls.
15. The shrimp deveining device of claim 1, further comprising a series of pointed stubs on each side of the blade.
16. The shrimp deveining device of claim 1, wherein the blade includes linear tabs extending downwards for snagging the vein.
17. The shrimp deveining device of claim 1, wherein the shrimp deveining device comprises an array of parallel channels, each having an inlet, outlet, bottom and walls for holding a shrimp in a substantially vertical orientation, a driver, and a blade protruding from the bottom of the channel for slicing open back meat of a shrimp rolling through the channel to expose the vein of the shrimp.
18. The shrimp deveining device of claim 1, wherein the channel and blade have a spiral shape.
19. The shrimp deveining device of claim 1, wherein the channel is arched.
20. The shrimp deveining device of claim 19, wherein the blade comprises a rotatable circular blade.
21. The shrimp deveining device of claim 20, wherein the circular blade includes slanted grooves to facilitate cutting.
22. The shrimp deveining device of claim 20, further comprising a series of barbs downstream from the circular blade for snagging a vein.
23. The shrimp deveining device of claim 1, where the wall of the channel from which the blade protrudes is stepped.
24. The shrimp deveining device of claim 1, further comprising stabilizers on each side of the blade.
25. The shrimp deveining device of claim 1, wherein the walls of the channel include a first inner side wall, a second inner side wall, a bottom wall extending between the first inner side wall and second inner side wall, a first outer side wall and a second outer side wall, wherein the first outer side wall and second outer side wall flank the first inner side wall and second inner side wall.
26. The shrimp deveining device of claim 25, wherein the first inner side wall and second inner side wall are shorter than the first outer side wall and second outer side wall.

27. The shrimp deveining device of claim 26, wherein the first outer side wall and second outer side wall taper above the first inner side wall and second inner side wall to form overflow vents for draining fluid from the channel.

28. The shrimp deveining device of claim 1, further comprising a connector for connecting the shrimp deveining device to a frame of a shrimp deveining system.

29. The shrimp deveining device of claim 1, wherein one of said walls of the channel is twisted at an interface with an infeed device.

* * * * *